(12) United States Patent
Schaltegger et al.

(10) Patent No.: US 11,788,630 B2
(45) Date of Patent: Oct. 17, 2023

(54) VACUUM VALVE

(71) Applicant: VAT Holding AG, Haag (CH)

(72) Inventors: Lukas Schaltegger, Grabs (CH); Clemens Kühne, Valens (CH)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 17/832,870

(22) Filed: Jun. 6, 2022

(65) Prior Publication Data
US 2022/0390020 A1    Dec. 8, 2022

(30) Foreign Application Priority Data

Jun. 4, 2021   (DE) .......................... 102021114422.1

(51) Int. Cl.
| | |
|---|---|
| *F16K 3/02* | (2006.01) |
| *F16K 51/02* | (2006.01) |
| *F16K 3/32* | (2006.01) |
| *F16K 31/122* | (2006.01) |
| *F16K 3/316* | (2006.01) |

(52) U.S. Cl.
CPC ............ *F16K 3/0254* (2013.01); *F16K 3/316* (2013.01); *F16K 3/32* (2013.01); *F16K 31/122* (2013.01); *F16K 51/02* (2013.01)

(58) Field of Classification Search
CPC .......... F16K 3/0254; F16K 3/316; F16K 3/32; F16K 3/122; F16K 5/02
See application file for complete search history.

(56) References Cited

U.S. PATENT DOCUMENTS 5,415,376 A * 5/1995 Ito .............................. F16K 3/18
                                                             251/158
6,082,706 A * 7/2000 Irie .......................... F16K 3/184
                                                             251/158

(Continued)

FOREIGN PATENT DOCUMENTS

DE    102014109673 A1    1/2015
WO    2016142150         9/2016

(Continued)

OTHER PUBLICATIONS

German Search Report dated Apr. 6, 2022 for German Patent Application No. 10 2021 114 422.1 and translation of p. 2 of 4.

*Primary Examiner* — Daphne M Barry
(74) *Attorney, Agent, or Firm* — Volpe Koenig

(57) ABSTRACT

A vacuum valve including a housing, a closure unit with two valve plates, supported by a valve rod, and a carrier piece connected rigidly to the valve rod, a transmission unit, a drive unit with a base body and an actuator, a longitudinal linear guide, by which the transmission unit is guided parallel to a longitudinal adjusting direction relative to the base body, an oblique linear guide, by which the carrier piece is guided parallel to an oblique adjusting direction relative to the transmission unit, a spring acting between the transmission unit and the carrier piece, a stop device which blocks adjustment of the closure unit in the longitudinal adjusting direction in a middle position thereof, and a blocking unit, which in the locked state blocks an adjustment of the closure unit situated in the middle position counter to the longitudinal adjusting direction and, in the release state, allows adjustment.

10 Claims, 16 Drawing Sheets

(56) References Cited

U.S. PATENT DOCUMENTS

| | | | | |
|---|---|---|---|---|
| 6,416,037 | B1* | 7/2002 | Geiser | F16K 3/18 |
| | | | | 277/634 |
| 6,494,434 | B1* | 12/2002 | Geiser | F16K 51/02 |
| | | | | 74/25 |
| 6,561,483 | B2* | 5/2003 | Nakagawa | F16K 3/188 |
| | | | | 251/175 |
| 7,658,367 | B2* | 2/2010 | Geiser | F16K 51/02 |
| | | | | 251/301 |
| 2008/0017822 | A1* | 1/2008 | Schoen | F16K 3/18 |
| | | | | 251/158 |
| 2014/0042354 | A1* | 2/2014 | Orr | F16K 3/184 |
| | | | | 251/329 |
| 2014/0131603 | A1* | 5/2014 | Blecha | F16K 3/18 |
| | | | | 251/158 |
| 2017/0204647 | A1* | 7/2017 | Ehrne | E05F 15/57 |
| 2018/0051825 | A1* | 2/2018 | Ehrne | F16K 51/02 |
| 2018/0231133 | A1* | 8/2018 | Netzer | F16K 51/02 |

FOREIGN PATENT DOCUMENTS

| | | |
|---|---|---|
| WO | 2016/155976 A1 | 10/2016 |
| WO | 2021083669 | 5/2021 |

* cited by examiner

VACUUM VALVE

INCORPORATION BY REFERENCE

The following documents are incorporated herein by reference as if fully set forth: German Patent Appln. No.: DE 10 2021 114 422.1, filed Jun. 4, 2021.

TECHNICAL FIELD

The invention relates to a vacuum valve comprising a valve housing with a first valve opening which has an axis and is surrounded by a first valve seat, a closure unit which has a valve rod which protrudes out of the valve housing, a carrier piece which is connected rigidly to the valve rod outside the valve housing, and a first valve plate which is supported by the valve rod and is arranged within the valve housing, it being possible for the closure unit to be adjusted, starting from an open position, in which the first valve plate releases the first valve opening, in a longitudinal adjusting direction into a middle position, in which the first valve plate covers the first valve opening but is lifted up from the first valve seat, and, starting from the middle position, in a transverse adjusting direction, which lies at a right angle with respect to the longitudinal adjusting direction, into a first closing position, in which the first valve plate bears against the first valve seat, a transmission unit, a drive unit with a base body, connected rigidly to the valve housing, and at least one actuator, at least one longitudinal linear guide, by which the transmission unit is guided displaceably parallel to the longitudinal adjusting direction with respect to the base body of the valve drive, it being possible for the transmission unit to be adjusted by the at least one actuator with respect to the base body in the longitudinal adjusting direction from a starting position via an intermediate position into a first active position, at least one oblique linear guide, by which the carrier piece is guided displaceably with respect to the transmission unit parallel to an oblique adjusting direction which lies in a plane, defined by the longitudinal adjusting direction and transverse adjusting direction, at an angle with respect to the longitudinal adjusting direction and at an angle with respect to the transverse adjusting direction, at least one spring which acts between the transmission unit and the carrier piece and which drives the carrier piece during the adjustment of the transmission unit with respect to the base body from the starting position as far as the intermediate position, an adjustment of the closure unit taking place in the longitudinal adjusting direction from the open position into the middle position, and a stop device which blocks an adjustment of the closure unit in the longitudinal adjusting direction in the middle position of the closure unit, further driving of the carrier piece in the longitudinal adjusting direction being blocked during the further adjustment of the transmission unit with respect to the base body from the intermediate position into the first active position, and an adjustment of the transmission unit with respect to the carrier piece taking place in the oblique adjusting direction with deformation of the closure unit, and therefore an adjustment of the closure unit taking place in the transverse adjusting direction from the middle position into the first closed position.

BACKGROUND

A vacuum valve of this type is apparent from US 2017/0204647. In order to close and to open the vacuum valve, merely one actuator is required which displaces the transmission unit parallel to the longitudinal adjusting direction. Here, during closing of the vacuum valve, the closure unit is first of all driven via a spring which is arranged between the transmission unit and the closure unit. When the closure unit reaches the middle position, a stop part of the closure unit runs against a stop face, as a result of which a further adjustment of the closure unit in the longitudinal adjusting direction is blocked. During the further adjustment of the transmission unit in the longitudinal adjusting direction, the transmission unit is adjusted as a result along an oblique linear guide in an oblique adjusting direction with respect to a carrier piece, supporting the valve rod, of the closure unit. As a result, the adjustment of the closure unit from the middle position into the closed position occurs, in which closed position the valve opening is sealed by the valve plate.

Advantages of this vacuum valve are the simple drive and operation and the reliable and robust configuration, it being possible for conventional linear guides to be used as longitudinal and oblique linear guides, as are used in large numbers in mechanical engineering as standard components. Linear guides of this type are inexpensive, smooth-running and have a small amount of play or no play (by being preloaded).

If the seal of the valve plate is worn and a service of the vacuum valve is required, the two vacuum chambers which are connected to one another via the vacuum valve have to be flooded.

US 2018/0051825 A1 has disclosed a vacuum valve, the closure unit of which has a first and a second valve plate, it being possible for a first and a second valve opening to be closed selectively by the first and second valve plate. A carrier piece which is attached to the valve rod outside the vacuum region is connected via a longitudinal linear guide and an oblique linear guide to a base body of the drive unit of the vacuum valve. By means of a longitudinal stroke drive, the carrier piece can be displaced along the longitudinal linear guide until the valve plates come to lie in a region between the two valve openings. Starting from this position, a respective one of the valve plates can be pressed onto the associated valve opening, by the carriages of the oblique linear guides being displaced by a transverse stroke drive with respect to guide rails of the oblique linear guides, starting from a middle position, into a first press-on position or a second press-on position.

When the first valve plate closes the first valve opening, a service of the second valve plate can be carried out without it being necessary for the chamber which is closed by the first valve plate to be flooded, and vice versa. In process chambers of vacuum systems for the semiconductor industry, for example, aggressive process gases are as a rule used, by way of which high wear of the seal of a valve plate which closes the access to said vacuum chamber occurs, with the result that a frequent service of the valve plate of this type is required. In the case of a service of this type, the transfer chamber which is connected to the process chamber via the vacuum valve therefore does not have to be flooded if the access to said transfer chamber is sealed by way of the other valve plate, with the result that the production can proceed further via said transfer chamber and other process chambers.

One disadvantage of this vacuum valve consists in that there have to be separate longitudinal stroke and transverse stroke drives.

Further vacuum valves with longitudinal linear guides and oblique linear guides which lie in an inclined manner with respect to one another but with only one valve plate and separate drives for the adjustment operations in the longitudinal adjusting direction and transverse adjusting direction are known from WO 2016/142150 A1 and WO 2021/083669 A1.

SUMMARY

It is an object of the invention to provide an advantageous vacuum valve of the type mentioned at the outset, in the case of which first and second valve openings can be sealed selectively by means of first and second valve plates. This takes place by way of a vacuum valve with one or more of the features disclosed herein.

Therefore, in addition to the first valve opening, the vacuum valve according to the invention has a second valve opening which is surrounded by a second valve seat and lies opposite the first valve opening, and has, in addition to the first valve plate, a second valve plate which is supported by the valve rod, it being possible for the closure unit to be adjusted, starting from an open position, into a middle position, in which the two valve plates lie opposite the valve openings, but are lifted up from the valve seats, and, starting from the middle position, in and counter to a transverse adjusting direction into a first and a second closed position, the first valve plate bearing against the first valve seat in the first closed position, and the second valve plate bearing against the second valve seat in the second closed position.

To this end, furthermore, the vacuum valve has a blocking unit which can be switched over between a locked state and a release state. In the locked state of the blocking unit, the adjustment of the closure unit which is situated in the middle position is blocked counter to the longitudinal adjusting direction, that is to say in the direction of the open position, and an adjustment of this type is released in the release state. If, starting from a state, in which the transmission unit is situated in the intermediate position, the closure unit is situated in the middle position and the blocking unit is situated in the locked state, the transmission unit is adjusted by way of the at least one actuator of the drive unit from the intermediate position as far as a second active position counter to the longitudinal adjusting direction with respect to the base body of the drive unit, an adjustment of the transmission unit with respect to the carrier piece counter to the oblique adjusting direction and therefore an adjustment of the carrier piece with respect to the base body counter to the transverse adjusting direction, that is to say of the closure unit from the middle position and the second closed position, occurs with the formation of the at least one spring which acts between the transmission unit and the carrier piece.

The vacuum valve according to the invention therefore requires only one drive unit which acts parallel to the longitudinal adjusting direction. The closure unit can be adjusted from the open position into the middle position, into the first closed position and into the second closed position solely by way of the adjustment of the transmission unit by way of the at least one actuator of the drive unit parallel to the longitudinal adjusting direction and the corresponding actuation of the blocking unit.

Rail guides can advantageously be used for the at least one longitudinal linear guide and at least one transverse linear guide, that is to say there is a guide part which is configured in the form of a guide rail and along which the carriage can be displaced. In particular, the carriage can be mounted using rolling bodies with respect to the guide rail, for example by means of recirculating rolling body guides or by means of rolling bodies which are mounted in running cages. Sliding guidance of the carriage with respect to the guide rails is also fundamentally possible. Conventional linear guides can preferably be used, as are used in large quantities in mechanical engineering as standard components. Linear guides of this type are inexpensive, smooth-running and have a small amount of play or no play (by being preloaded).

The use of linear guides which are configured in some other form would also be conceivable and possible, for example shaft guides, in the case of which the guide parts are formed by rods which are, in particular, round in cross section. The configuration of a linear guide by means of at least one guide track is also conceivable and possible, into which guide track at least one guide projection (pin or roller) engages, that is to say a configuration in the manner of a slotted guide. The guide track can be formed, for example, by a slot, a groove or a bead.

The oblique adjusting direction preferably encloses an angle with the longitudinal adjusting direction in the range from 5° to 20°, for example of approximately 10°.

In one advantageous embodiment of the invention, the valve rod has at least one laterally protruding projection which forms a stop part of the stop device.

During the adjustment of the transmission unit, starting from the starting position, in the longitudinal adjusting direction, the closure unit is first of all driven via the at least one spring in the longitudinal adjusting direction until the transmission unit reaches the intermediate position. As a result, the closure unit has been adjusted from the open position into the middle position. In said middle position, the at least one stop part of the stop device which is stationary with respect to the closure unit and is formed, for example, by at least one projection which protrudes from the valve rod comes into contact with a stop face which is arranged, in particular, on the base body of the drive unit or a part which is connected to it, as a result of which a further adjustment of the closure unit in the longitudinal adjusting direction is blocked.

The blocking unit preferably interacts with the at least one protruding projection of the valve rod. A blocking part of the blocking unit can be adjusted with respect to a base part of the blocking unit. In the locked state of the blocking unit, the blocking part lies directly behind the at least one projection of the valve rod in relation to the longitudinal adjusting direction, with the result that the movement of the valve rod counter to the longitudinal adjusting direction is blocked. In the release state of the blocking unit, the blocking part is adjusted with respect to this, for example by way of a displacement at a right angle with respect to the longitudinal adjusting direction, for example parallel to the transverse adjusting direction, in such a way that it releases the displacement of the valve rod counter to the longitudinal adjusting direction. Pivoting about a pivot axis would also be conceivable and possible instead of a linear displacement of the blocking part.

The adjustment of the blocking part with respect to the base part of the blocking unit can take place, for example, by means of at least one pneumatic piston/cylinder unit. An electromagnetic adjustment would also be conceivable and possible.

During the adjustment of the transmission unit from the starting position into the intermediate position, driving of the closure unit from the open position into the middle position preferably takes place without a deformation of the at least one spring which acts between the transmission unit and the carrier piece. To this end, the at least one spring is preloaded.

One possible embodiment of the invention provides that a respective spring is arranged on a bolt, the spring being supported on one side on a rear (in relation to the oblique adjusting direction) stop part, and on the other side on a front (in relation to the oblique adjusting direction) stop part, the stop parts being arranged displaceably on the bolt, and the displacement of the rear stop part in the direction towards a rear end of the bolt being delimited by a rear stop, and the displacement of the front stop part in the direction towards a front part of the bolt being delimited by way of a front stop, and the rear stop and the front stop being stationary with respect to the bolt. The rear end of the bolt is fastened to the transmission unit, and the front and rear stop part bear against a front and a rear stop face which are stationary with respect to the carrier piece.

When the transmission unit is displaced from the intermediate position into the first active position, the displacement of the transmission unit with respect to the carrier piece in the oblique adjusting direction occurs, the respective bolt being displaced in this direction with respect to the carrier piece, and the rear stop part being driven here by the rear stop of the bolt, and the front stop part being held in a stationary manner with respect to the carrier piece by the front stop face, as a result of which the spring is compressed from the rear end.

If the transmission unit and is displaced from the intermediate position into the second active position in the locked state of the blocking unit, an adjustment of the transmission unit with respect to the carrier piece counter to the oblique adjusting direction occurs, the bolt being driven by the transmission unit, and the rear stop part being driven by way of the rear stop of the bolt, while the front stop part is held by the front stop face in a stationary manner with respect to the carrier piece and therefore against a displacement counter to the oblique adjusting direction. The compression of the spring therefore occurs from the front end.

BRIEF DESCRIPTION OF THE DRAWINGS

Further advantages and details of the invention will be explained in the following text on the basis of the appended drawing, in which.

DETAILED DESCRIPTION

Figure 1:
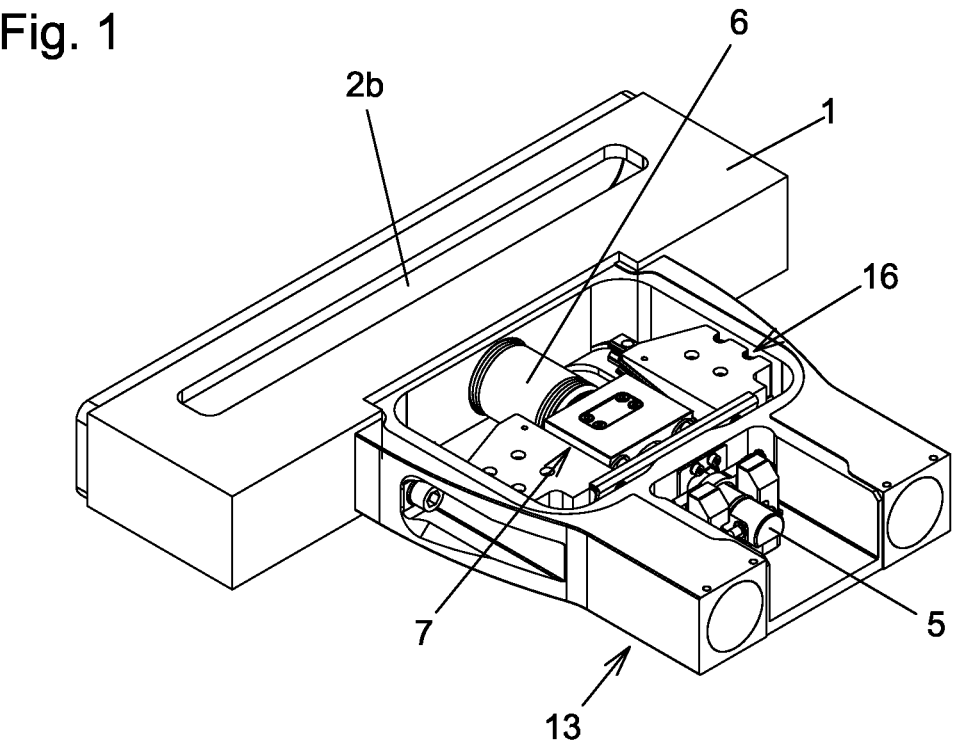
FIG. 1 shows a perspective view of a vacuum valve according to the invention in the open position of the closure unit.
Figure 2:
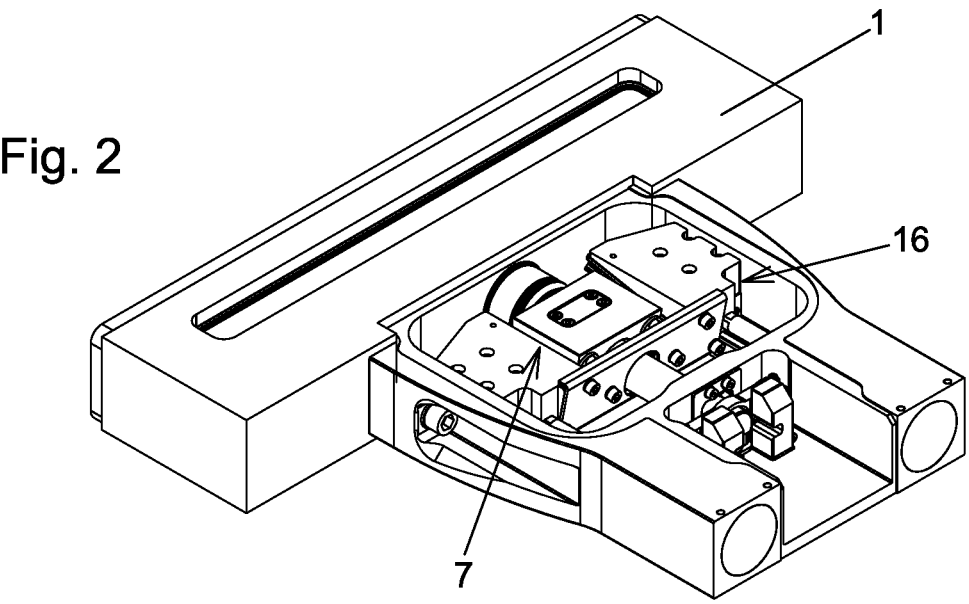
FIG. 2 shows it in the middle position of the closure unit.
Figure 3:
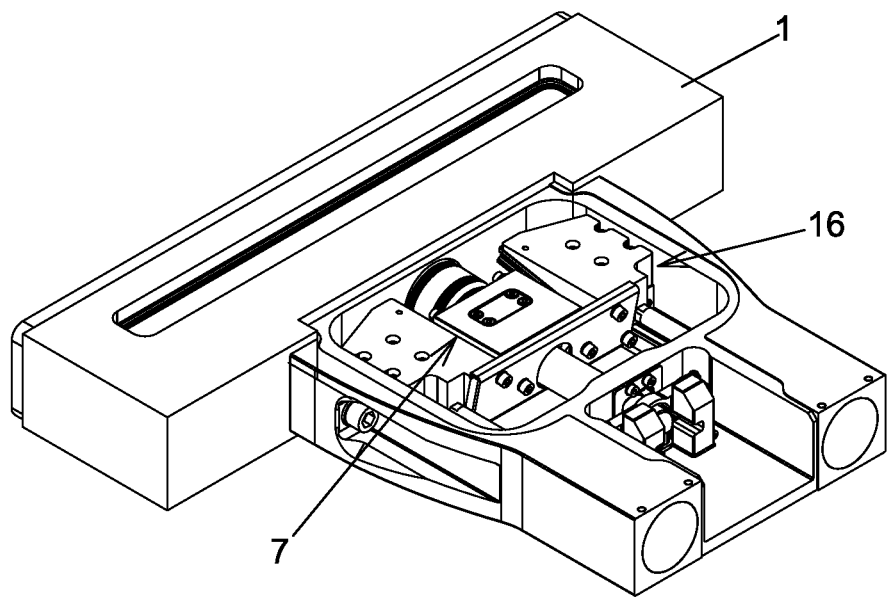
FIG. 3 shows it in the first closed position of the closure unit.
Figure 4:
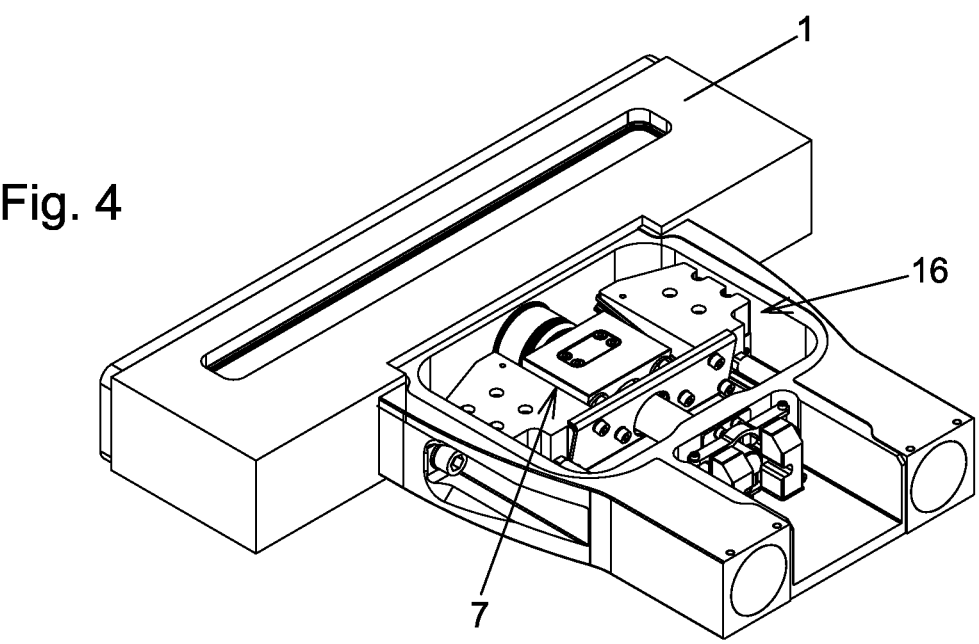
FIG. 4 shows it in the middle position of the closure unit and the intermediate position of the transmission unit during the movement of the transmission unit from the first active position into the second active position in the locked state of the blocking unit.
Figure 5:
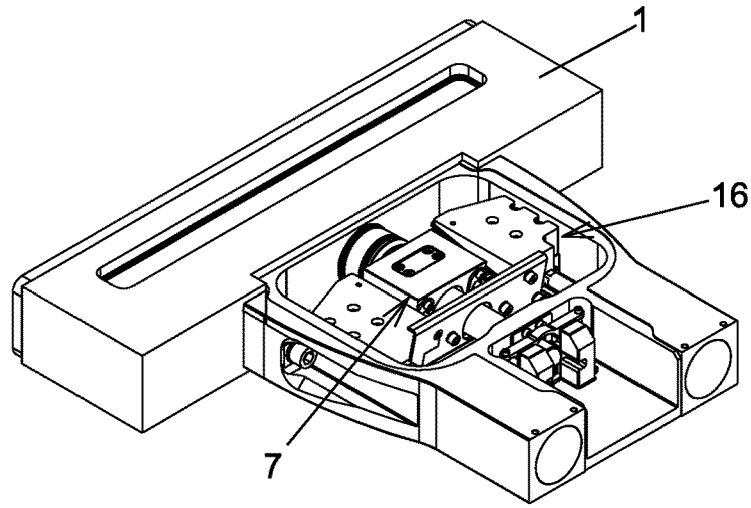
FIG. 5 shows it in the second closed position of the closure unit.
Figure 6:
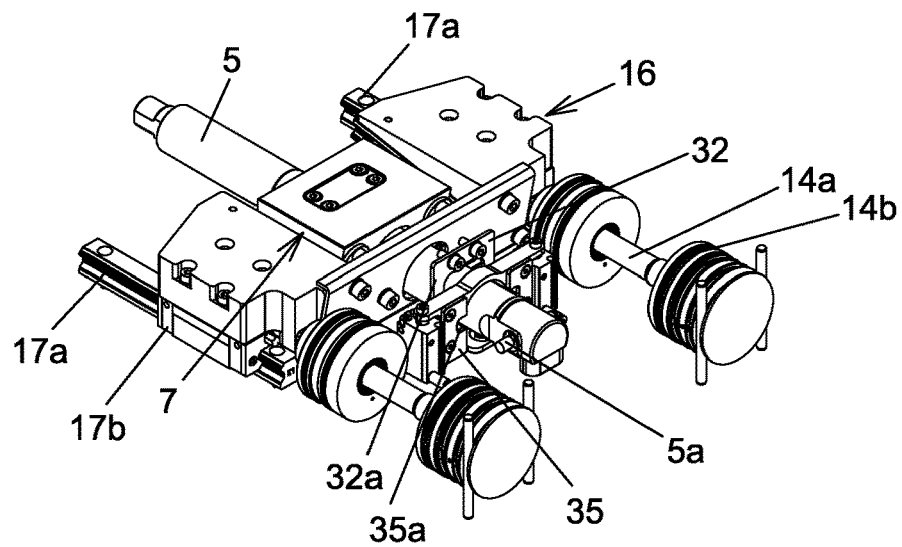
FIGS. 6 to 10 show illustrations which are analogous to FIGS. 1 to 5, but without the valve housing, without the valve plates with the carrier, to which they are attached, and without the base body of the drive unit.
Figure 7:
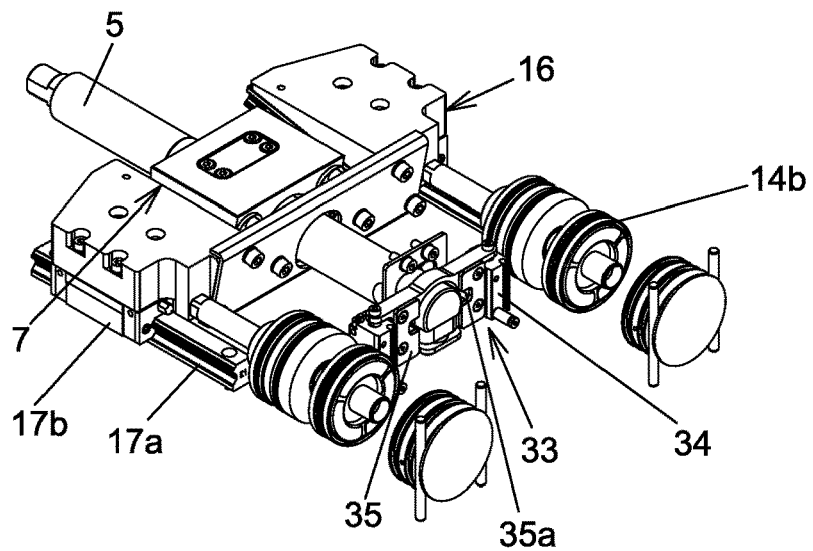
Figure 8:
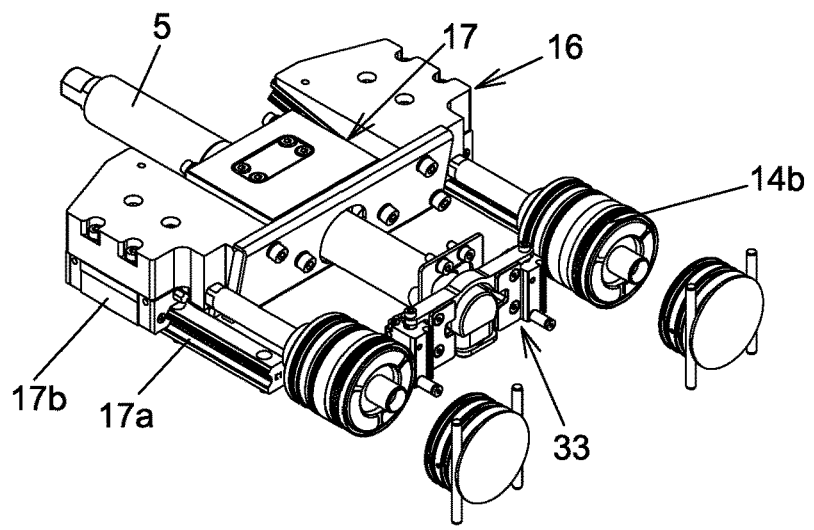
Figure 9:
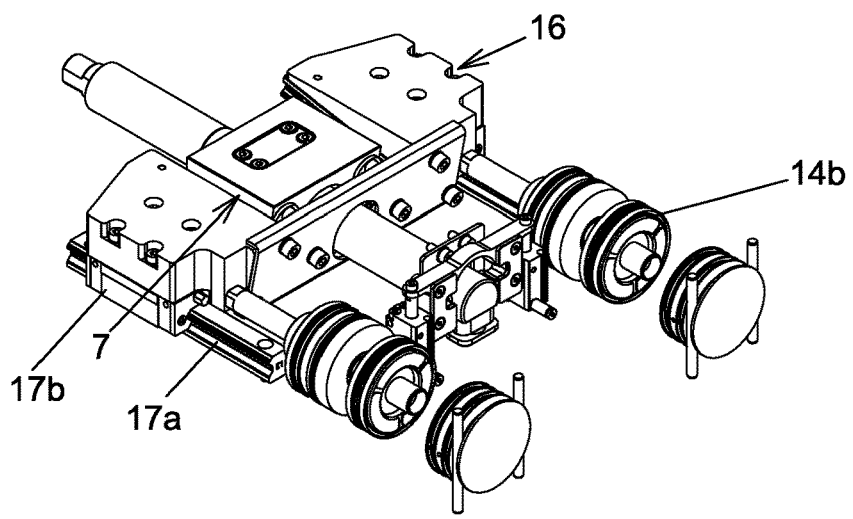
Figure 10:
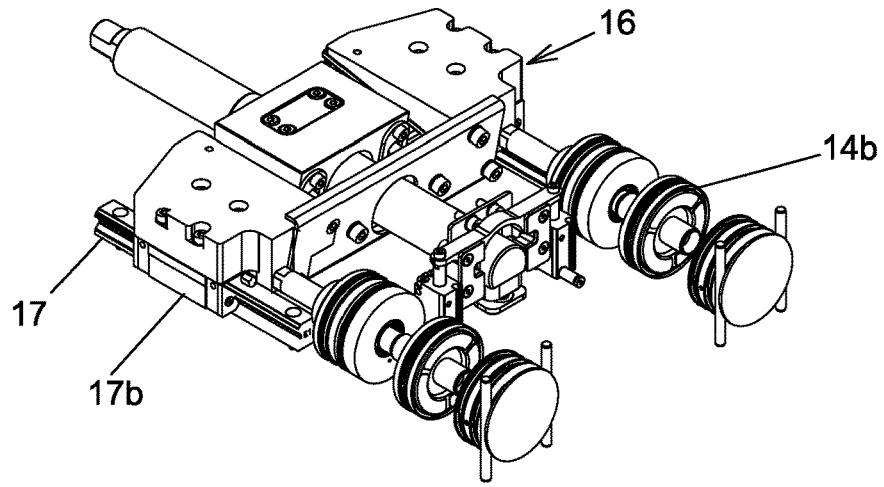
Figure 11:
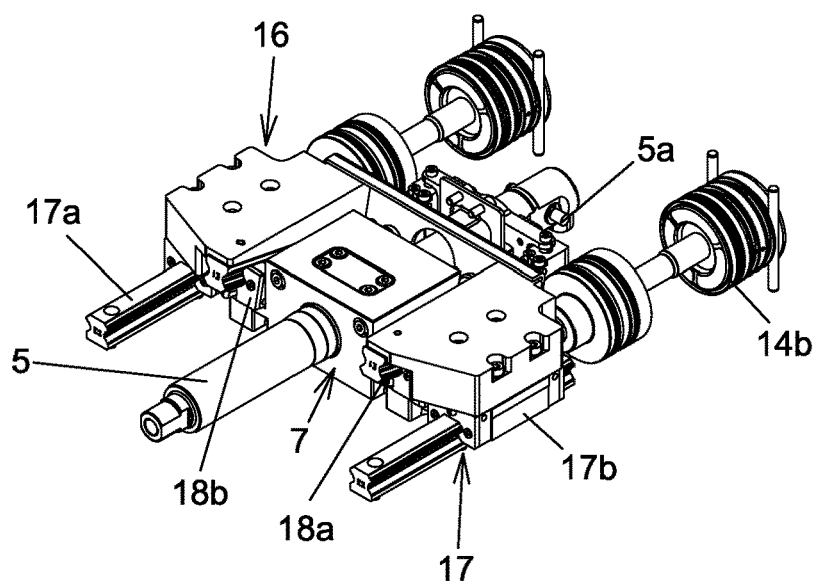
FIGS. 11 to 15 show illustrations which are analogous to FIGS. 6 to 10 from another viewing direction.
Figure 12:
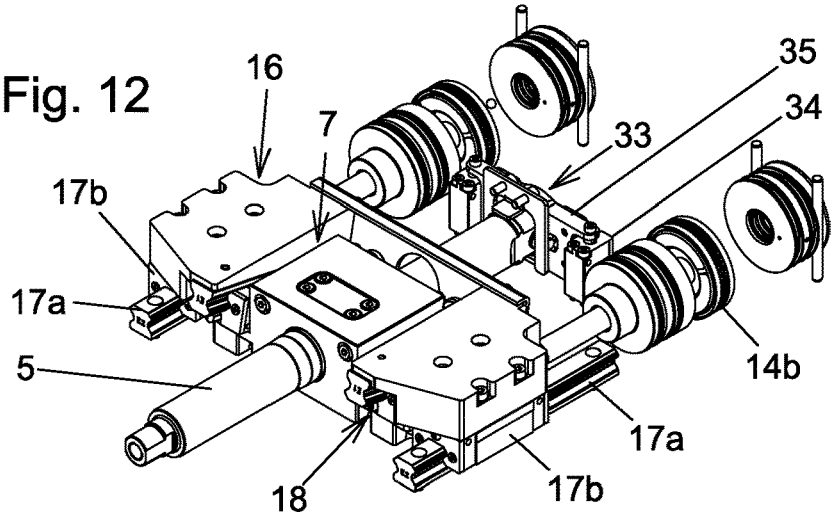
Figure 13:
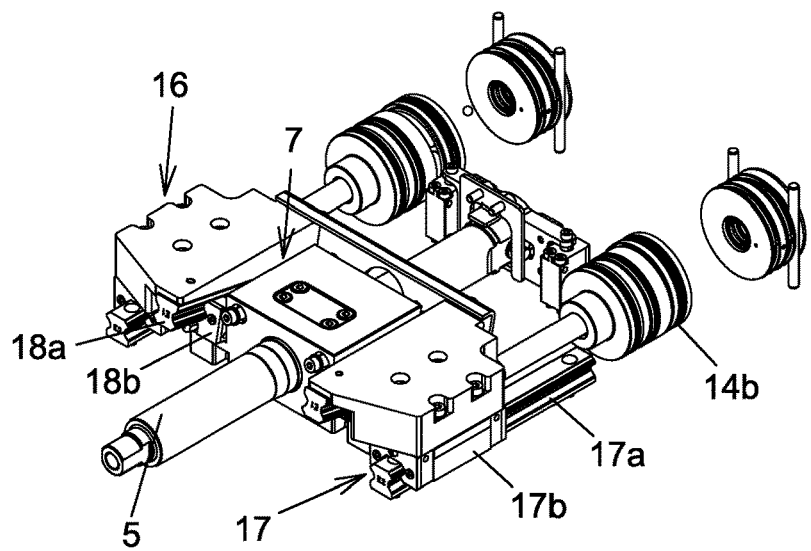
Figure 14:
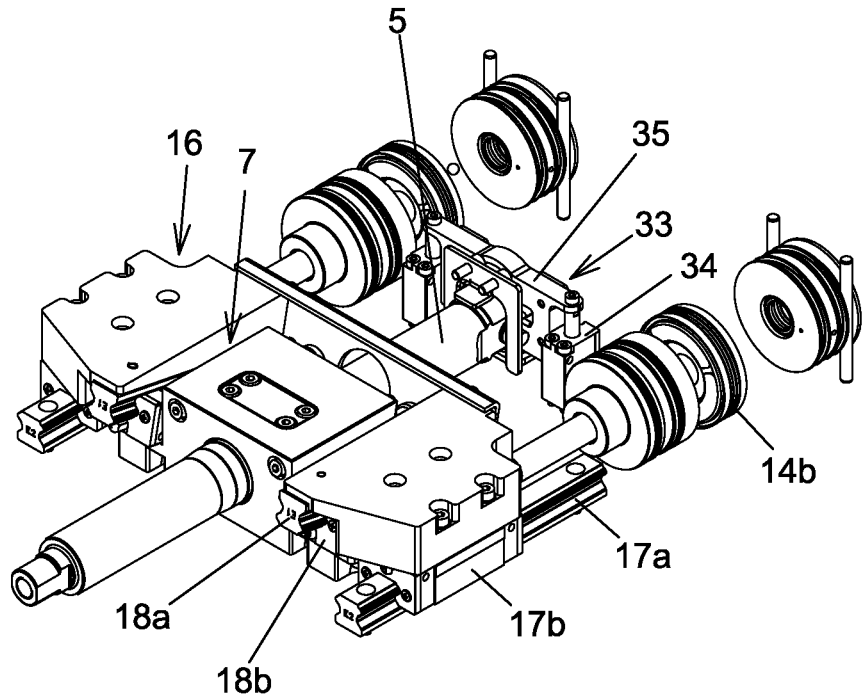
Figure 15:
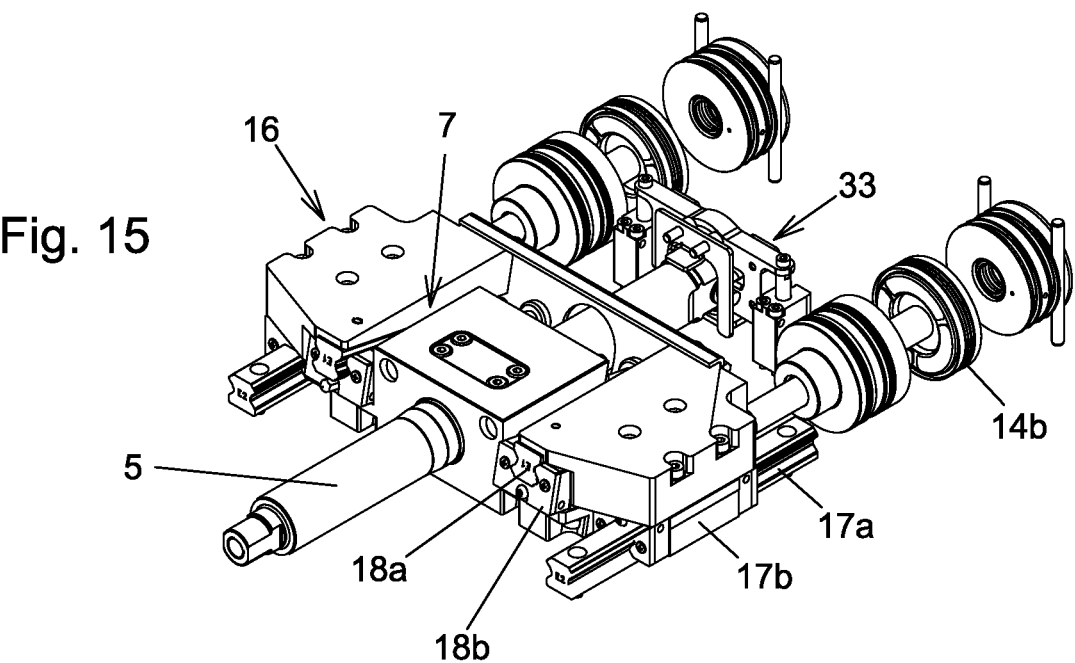
Figure 16:
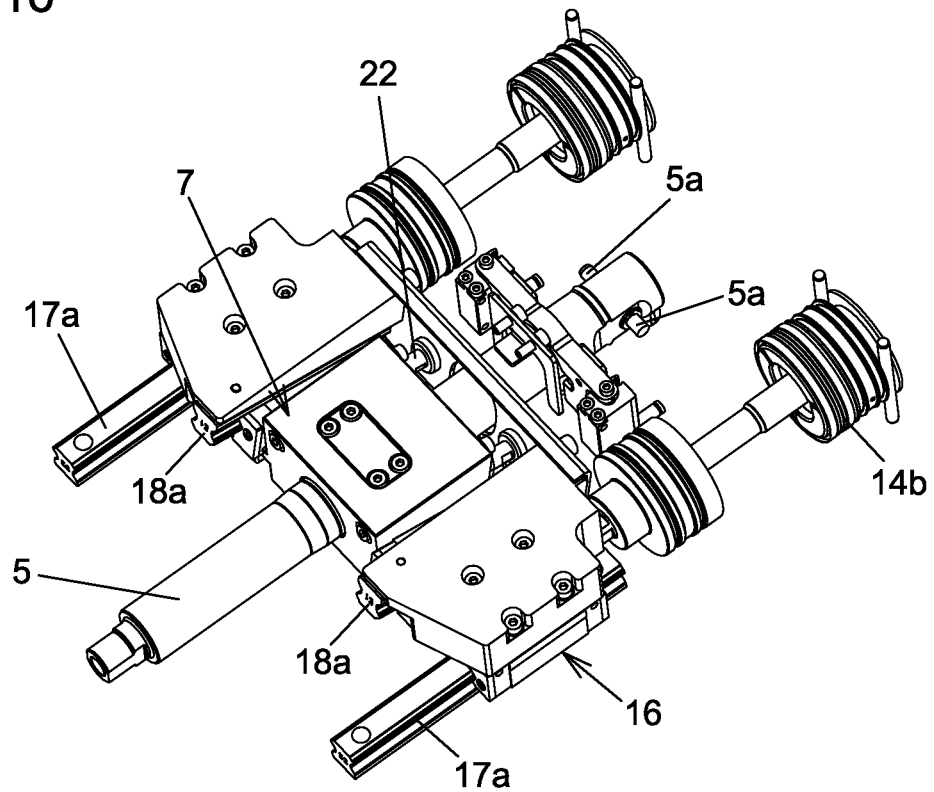
FIGS. 16 to 20 show illustrations which are analogous to FIGS. 5 to 10 from a viewing direction which is changed again, FIG. 21 show a view of the vacuum valve in the open position of the closure unit, FIG. 22 show a section along the line A-A from FIG. 21, FIG. 23 show a section in accordance with FIG. 22 in the middle position of the closure unit, FIG. 24 show a section in accordance with FIG. 22 in the first closed position of the closure unit, FIG. 25 show a section in accordance with FIG. 22 in the middle position of the closure unit and the intermediate position of the transmission unit, during the adjustment of the transmission unit from the first active position into the second active position in the locked state of the blocking unit, FIG. 26 show a section in accordance with FIG. 22 in the second closed position of the closure unit, FIG. 27 show a section along the line B-B from FIG. 21, FIGS. 28 to 31 show sections in accordance with FIG. 27 in the positions in accordance with FIGS. 23 to 26.
Figure 17:
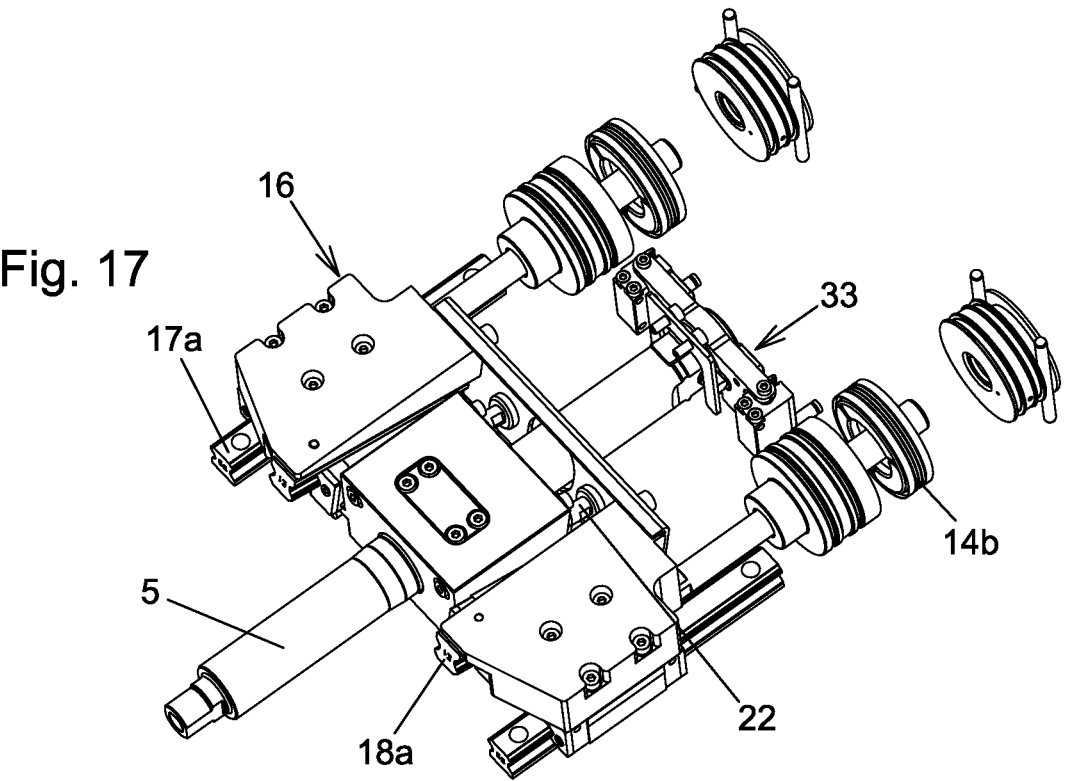
Figure 18:
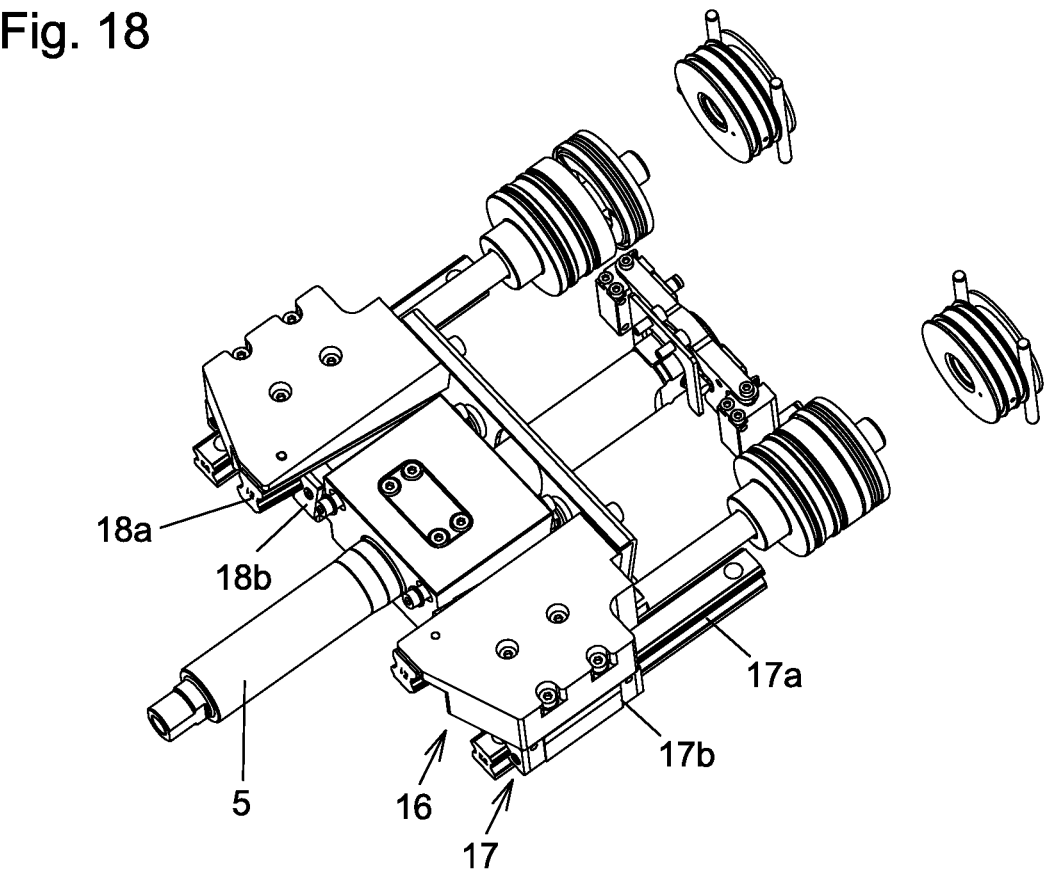
Figure 19:
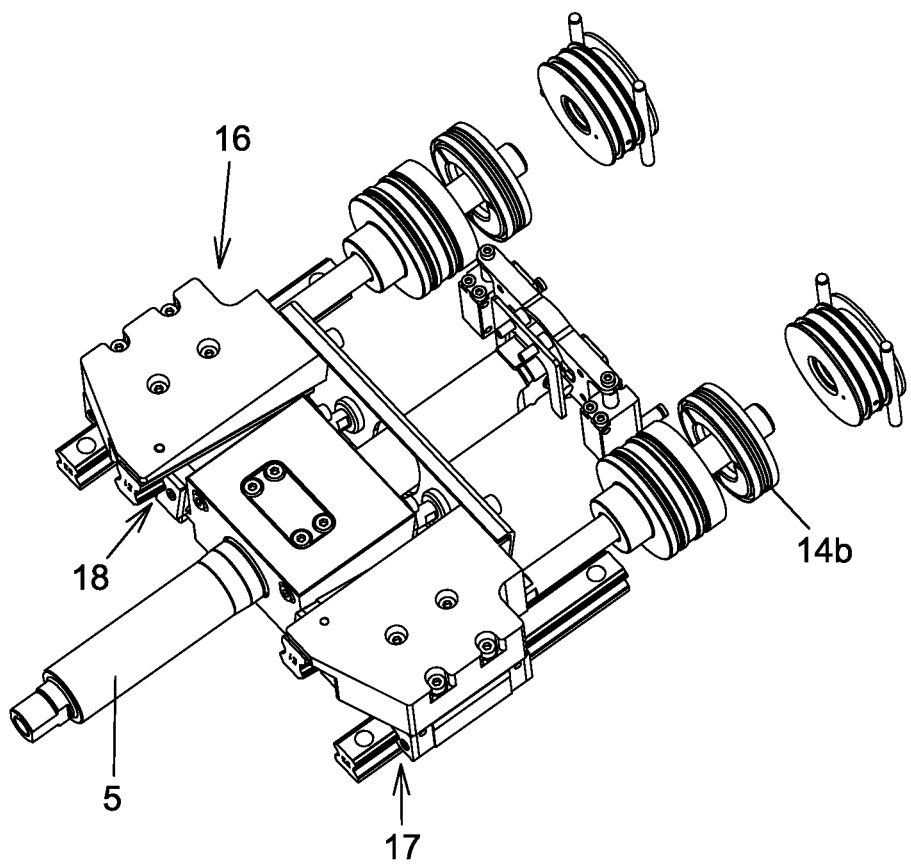
Figure 20:
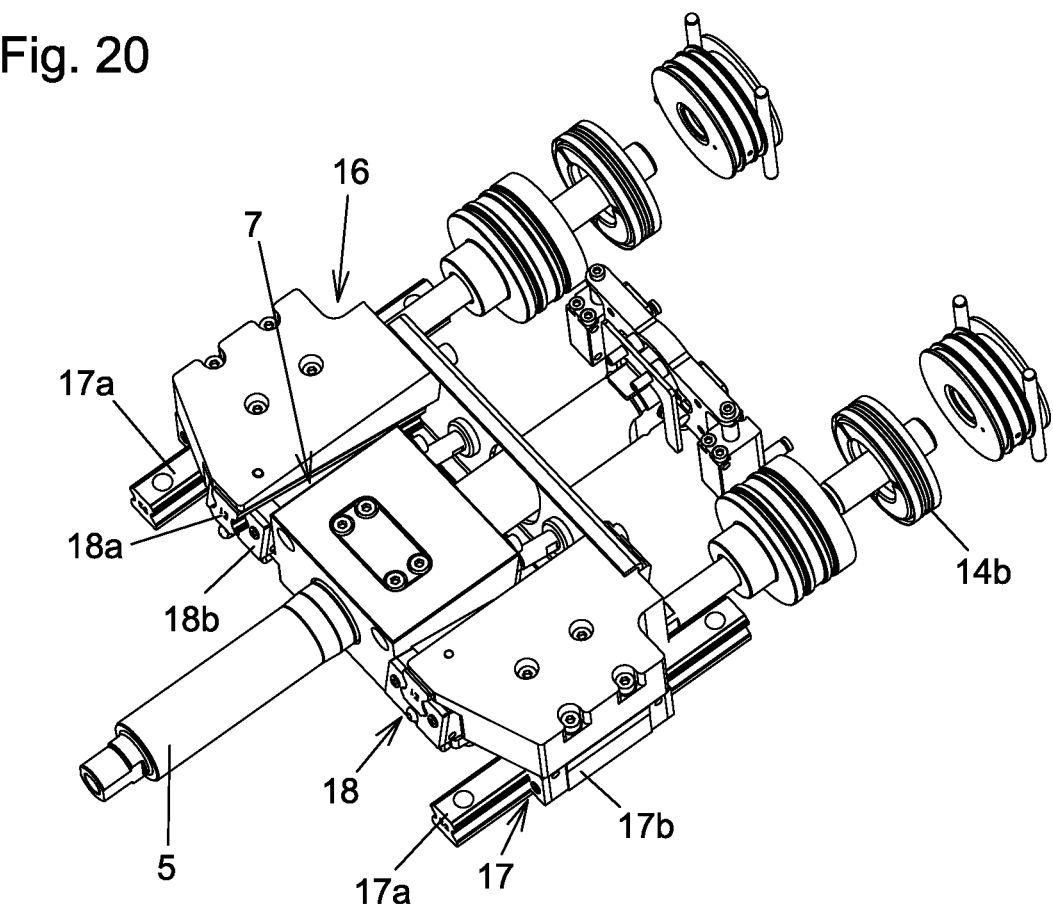
Figure 21:
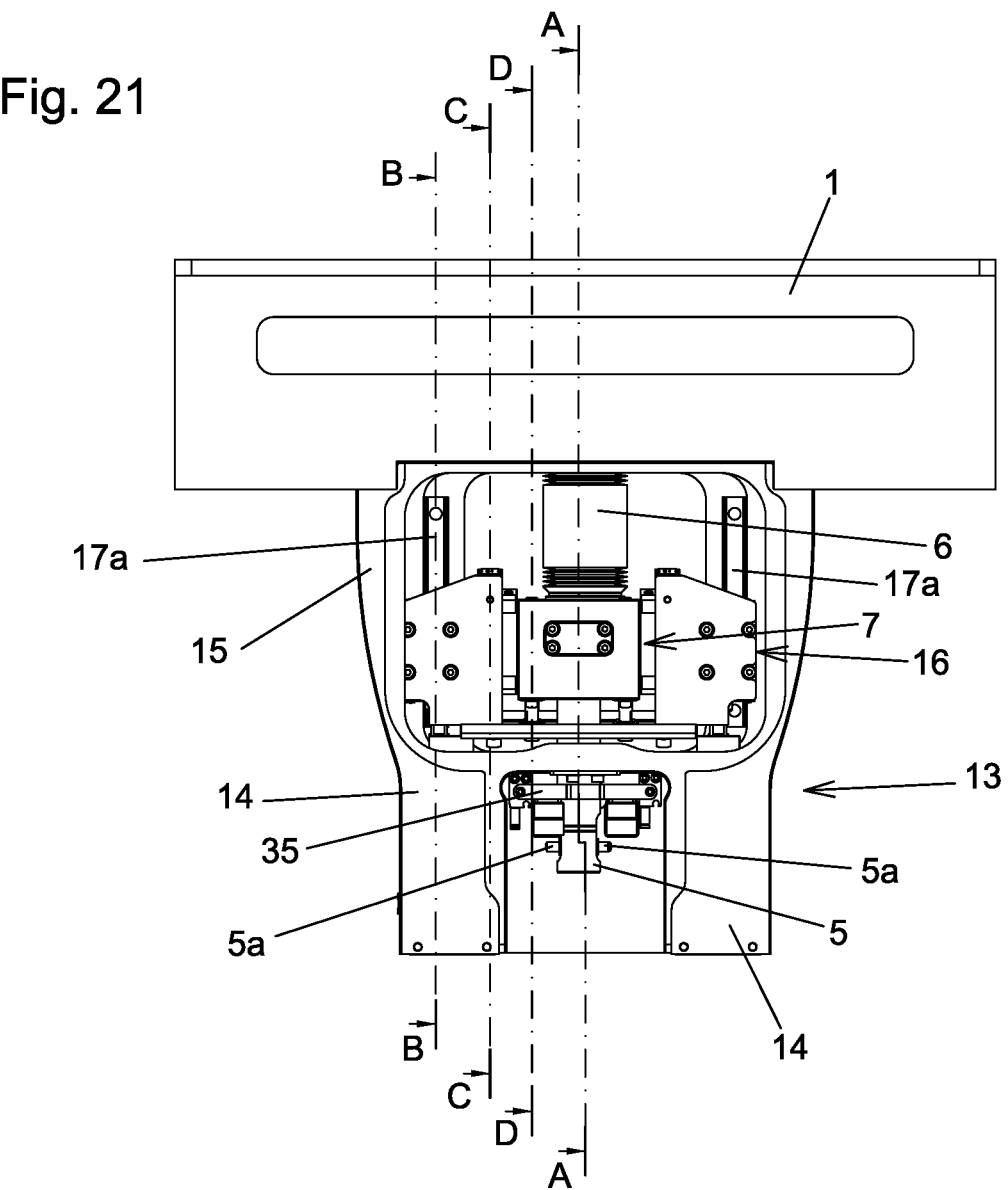
Figure 22:
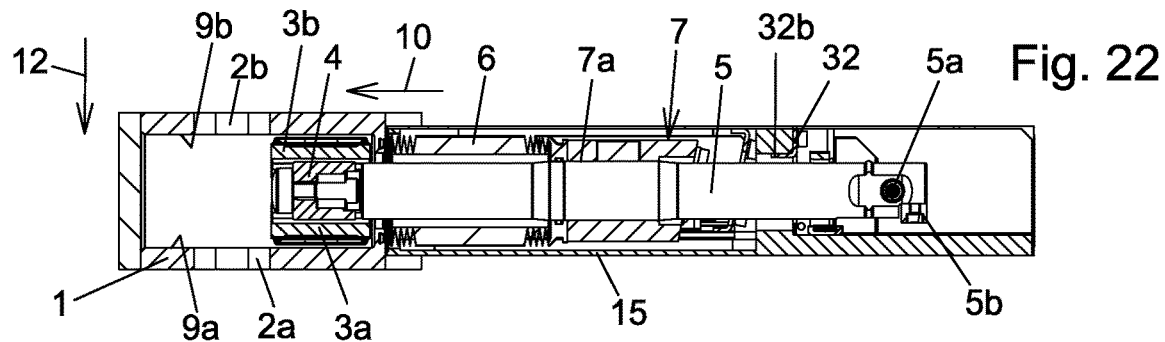
Figure 23:
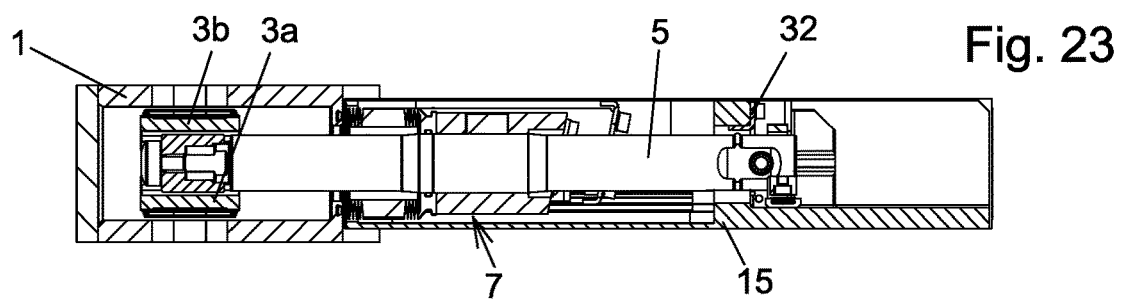

One exemplary embodiment of a vacuum valve according to the invention is shown in the figures.

The vacuum valve has a valve housing 1 with first and second valve openings 2a, 2b which lie opposite one another. First and second valve plates 3a, 3b which lie parallel to one another and are fastened to a valve rod 5 via a carrier 4 are arranged in the interior space of the valve housing 1, which interior space forms a vacuum region of the vacuum valve (=a region, in which they can be a vacuum). The valve rod is guided in a sealed manner out of the interior space of the valve housing 1, a diaphragm bellows 6 serving for sealing purposes in the exemplary embodiment, as is preferred. A carrier piece 7 is fastened rigidly to the valve rod 5 outside the valve housing 1, that is to say outside the vacuum region of the vacuum valve, preferably in a middle region of the longitudinal extent of the valve rod. Here, in the exemplary embodiment, the valve rod 5 penetrates a through opening through the carrier piece 7.

A closure unit 8 of the vacuum valve comprises the carrier piece 7, the valve rod 5 which is supported by the carrier piece 7, and the valve plates 3a, 3b which are supported by the valve rod 5 via the carrier 4, and said pieces move together during opening and closing of the vacuum valve.

In the open state of the vacuum valve, the closure unit 8 assumes an open position, cf. FIGS. 1, 6, 11, 16, 21, 22, 27, 32 and 37. In the open position of the closure unit 8, the first and second valve plates 3a, 3b release the first and second valve openings 2a, 2b, said valve plates 3a, 3b having been moved out of the region which lies between the valve openings 2a, 2b, that is to say a rectilinear through channel through the vacuum valve is released.

In the middle position of the closure unit, the first and second valve plates 3a, 3b cover the valve opening 2a, 2b, but are lifted up from the respective associated valve seat 9a, 9b which surrounds the respective valve opening 2a, 2b, cf. FIGS. 2, 7, 12, 17, 23, 28, 33 and 38.

The adjustment from the open position into the middle position takes place in a longitudinal adjusting direction 10. The latter lies parallel to the valve rod 5.

In the first closed position of the closure unit, the first valve plate 3a bears against the first valve seat 9a and seals the first valve opening 2a. In the second closed position of the closure unit, the second valve plate 3b bears against the second valve seat 9b and seals the second valve opening 2b. In order to seal the respective valve opening 2a, 2b by way of the respective valve plate 3a, 3b, the respective valve plate 3a, 3b has a sealing ring 11 made from elastomeric material, for example FKM or FFKM, and the respective valve seat 9a, 9b is formed by a sealing face which surrounds the respective valve opening 2a, 2b on the inner side of the valve housing 1 and against which the respective sealing ring 11 bears.

The adjustment of the closure unit 8 from the middle position into the first closed position takes place in a transverse adjusting direction 12 which lies at a right angle with respect to the longitudinal adjusting direction 10 and at a right angle with respect to the plane of the respective valve plate 3a, 3b. The adjustment of the closure unit 8 from the middle position into the second closed position takes place in the direction which is opposed to the transverse adjusting direction 12.

A drive unit 13 with actuators 14 serves to close and open the vacuum valve. Said actuators 14 are configured in the form of pneumatic piston/cylinder units in the exemplary embodiment. Instead, for example, electrically driven actuators might also be provided. In the exemplary embodiment, there are two actuators 14. Instead, only one actuator or more than two actuators might also be provided. If more than one actuator is provided, all the actuators act in the same direction, to be precise parallel to the longitudinal adjusting direction 10.

The drive unit 13 has a base body 15 which is connected rigidly to the valve housing 1. A single-piece configuration with the valve housing 1 is fundamentally conceivable and possible. In the exemplary embodiment, the cylinders of the actuators 14 are formed by parts of the base body 15. Separate cylinders might also be provided which are connected rigidly to the base body 15. A transmission unit 16 is adjusted parallel to the longitudinal adjusting direction 10 by the at least one actuator 14 of the drive unit 13. In the exemplary embodiment, the piston rods 14a of the actuators 14 are connected to the transmission unit 16 to this end. The pistons 14b are double-acting, in order to adjust the transmission unit in and counter to the longitudinal adjusting direction 10.

The transmission unit 16 is guided in a linearly displaceable manner parallel to the longitudinal adjusting direction 10 by a longitudinal linear guide 17. In the exemplary embodiment, the longitudinal linear guides 17 in each case have an elongate guide part which is connected to the base body 15 of the drive unit 13 and is oriented parallel to the longitudinal adjusting direction 10, in the form of a guide rail 17a which is attached to the base body 15, and a carriage 17b which is mounted by the guide rail such that it can be displaced along the guide rail and is attached to the transmission unit 16.

The carriage 17b is secured against lifting off from the guide rail 17a in the direction at a right angle with respect to the longitudinal direction of the guide rail 17a, by it engaging around the head section of the guide rail 17a, which head section has a greater width than an adjoining section.

A reversed arrangement of the at least one longitudinal linear guide 17, that is to say arrangement of the guide rail 17a on the transmission unit 16 and of the carriage 17b on the base body 15, is also fundamentally conceivable and possible.

In modified embodiments, only one longitudinal linear guide or more than two longitudinal linear guides might also be provided. Other embodiments of longitudinal linear guides are conceivable and possible, for example in the form of shaft guides or slotted guides as has already been mentioned.

The transmission unit 16 and the carrier piece 7 are mounted such that they can be displaced linearly with respect to one another by way of oblique linear guides 18, to be precise parallel to an oblique adjusting direction 19. The oblique adjusting direction 19 lies in the plane which is defined by the longitudinal adjusting direction 10 and transverse adjusting direction 12, and lies here at an angle both with respect to the longitudinal adjusting direction 10 and with respect to the transverse adjusting direction 12. For example, the angle 20 between the longitudinal adjusting direction 10 and the oblique adjusting direction 19 can lie in the region of approximately) 10° (±5°).

In the exemplary embodiment, the oblique linear guides 18 in each case have an elongate guide part which is oriented parallel to the oblique adjusting direction 19 in the form of a guide rail 18a, by which the carriage 18b is mounted such that it can be displaced along the guide rail 18a.

The carriage 18b is secured against lifting off from the guide rail 18a in the direction at a right angle with respect to the longitudinal extent of the guide rail 18a, by it engaging around the head section of the guide rail 18a, which head section has a greater width than an adjoining section.

The guide rails 18a are attached to the transmission unit 18, and the carriages 18b are attached to the carrier piece 7, a reversed arrangement also being possible.

Instead of two oblique linear guides 18, only one oblique linear guide 18 or more than two oblique linear guides 18 might also be provided.

Other embodiments of the at least one oblique linear guide 18 are conceivable and possible, for example in the form of a shaft guide or slotted guide as has already been mentioned.

In the exemplary embodiment, the transmission unit 16 has part pieces 16a, 16b which lie on both sides of the valve rod 5 and are connected by a plate-shaped connecting part 16c which has a passage opening, through which the valve rod 5 extends. The oblique linear guides 18 are therefore arranged between the respective part piece 16a, 16b and a respective section of the carrier piece 7 which lies on the side of the valve rod. In one modified embodiment, for example, a single-part transmission unit might be provided which might extend overall above or below the valve rod.

In the open state of the vacuum valve, in which the closure unit 8 is situated in the open position, the transmission unit 16 assumes a starting position. Springs 21 which are oriented parallel to the oblique adjusting direction 19 are arranged between the transmission unit 16 and the carrier piece 7. If the transmission unit 16 is displaced by the actuators 14, starting from the starting position, in the longitudinal adjusting direction 10 along the longitudinal linear guide 17 with respect to the base body 15 of the drive unit 13, this movement is transmitted via the springs 21 to the carrier piece 7 and therefore the closure unit 8. As a result, the carrier piece 7 and therefore the closure unit 8 are likewise displaced linearly in the longitudinal adjusting direction 10, to be precise from the open position as far as into the middle position which it assumes in an intermediate position of the transmission unit 16.

Figure 46:
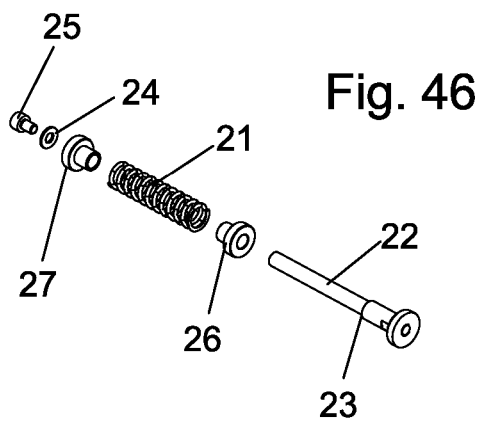
FIG. 46 shows an exploded illustration of one of the spring units.

The relative position between the transmission unit 16 and the carrier piece 7 therefore remains at least substantially unchanged during the displacement of the transmission unit 16 from the starting position as far as into the intermediate position. In order to keep the relative position of the carrier piece 7 with respect to the transmission unit 16 completely constant, the springs 21 are preloaded, as is preferred. There are spring units in the exemplary embodiment (cf., in particular, also FIG. 46), a respective spring 21 being arranged on a respective bolt 22 which is oriented parallel to the oblique adjusting direction 19. A respective bolt 22 is configured with a rear (in relation to the oblique adjusting direction 19) stop 23 which is formed by a stepped portion of the diameter of the bolt, and is provided with a first stop 24 which is formed by a shim 36 in the exemplary embodiment, which shim 36 is arranged between head of a screw 25, screwed into the end of the bolt, and the end of the bolt. In each case one stop part 26, 27 is arranged displaceably between the spring 21 and the respective stop 23, 24 on the bolt 22, on which the spring 21 is supported with one respective end. When the stop parts 26, 27 bear against the stops 23, 24, the spring 21 is compressed with respect to its release state, and is therefore preloaded.

The respective spring 21 with the stop parts 26, 27 lies between stop faces 28, 29 which is stationary with respect to the carrier piece 7 (cf. FIGS. 37-41). The stop face 29 which lies further to the front (in relation to the oblique adjusting direction 19) and against which the front stop part 27 bears in the open position of the closure unit 8, is formed by a stepped portion of a through bore 7a through the carrier piece 7 in the exemplary embodiment. The stop face 28 which lies further to the rear (in relation to the oblique adjusting direction 19) and against which the rear stop part 26 bears in the open position of the closure unit 8 is formed by a small plate 30 which partially covers the rear opening of the through bore 7a and is screwed onto the carrier piece 7. The bolt 22 penetrates an opening of said small plate 30 and is fastened to the transmission unit 16 at a rear (in relation to the oblique adjusting direction 19) end; in the exemplary embodiment, the fastening takes place by means of a screw 31 to the connecting part 16c.

If the carrier piece 7 is held firmly and the transmission unit 16 is pressed against the carrier piece 7 with a sufficiently great force, by way of which the preload of the springs 21 is overcome, the stop part 26 which lies at the rear (in relation to the oblique adjusting direction 19) can be lifted up from the stop face 28 by way of the transmission of this force via the stop 23 with compression of the spring 21 (cf. FIG. 39), the bolt 22 being displaced in the oblique adjusting direction 19 with respect to the carrier piece 7. The transmission unit 16 can therefore be displaced along the oblique linear guides 18 with respect to the carrier piece 7 with compression of the springs 21, cf. FIG. 39 in comparison with FIG. 38.

If the transmission unit 16 is held firmly and the carrier piece 7 is pressed against the transmission unit 16 with a sufficiently great force, by way of which the preload of the springs 21 is overcome, the stop part 27 which lies at the front (in relation to the oblique adjusting direction) can be lifted up from the stop face 29 by way of transmission of this force via the stop 23 with compression of the spring 21 (cf. FIG. 41), the bolt 22 being displaced counter to the oblique adjusting direction 19 with respect to the carrier piece 7. As a result, the carrier piece 7 can be displaced counter to the oblique adjusting direction along the oblique linear guides 18 with respect to the transmission unit 16, cf. FIG. 41 in comparison with FIG. 40.

Furthermore, there is a stop device. Said stop device delimits the displacement of the closure unit 8 in the longitudinal adjusting direction 10. A further displacement of the closure unit 8 in the longitudinal adjusting direction 10 is prevented by way of the stop device when the closure unit 8 has reached the middle position.

In the exemplary embodiment, to this end, the valve rod 5 has projections 5a which protrude on both sides in the region of its end which is remote from the valve plates 3a, 3b (preferably in a direction which lies at a right angle with respect to the longitudinal adjusting direction 10 and at a right angle with respect to the transverse adjusting direction 12), which projections 5a form stop parts of the stop device. Said projections 5a interact with a stop face 32a which is arranged on a small stop plate 32 which is screwed onto the base body. The small stop plate 32 can consist of a material which is suitable for the stop face 32a, for example stainless steel or a sufficiently hard plastic material, a sliding coating being possible. It would also be fundamentally conceivable and possible, however, that the stop face 32a is arranged directly on the base body 15.

The projections 5a can be formed, for example, by a bolt which is arranged in a bore of the valve rod.

In order to move the vacuum valve from the open state into the first closed state, in which the valve opening 2a is closed by the first valve plate 3a, the transmission unit 16 is therefore displaced by means of the at least one actuator 14 of the drive unit 13 in the longitudinal adjusting direction 10, starting from the starting position of the transmission unit 16, in which the closure unit 8 is situated in the open position. When the transmission unit 16 reaches the intermediate position, the closure unit 8 reaches the middle position, in which the projections 5a of the valve rod which form the stop parts of the stop device come into contact with the stop face 32a which is stationary with respect to the base body 15. During the further displacement of the transmission unit 16 in the longitudinal adjusting direction 10, the transmission unit 16 is therefore pressed against the carrier piece 7, and a displacement of the transmission unit 16 with respect to the carrier piece 7 along the oblique linear guides 18 occurs with compression of the springs 21. As a result, the carrier piece 7 and therefore the closure unit 8 are therefore displaced in the transverse adjusting direction 12 until the first valve plate 3a is pressed onto the first valve seat 9a. During this displacement of the carrier piece 7 in the transverse adjusting direction 12, the projections 5a of the valve rod 5 are displaced along the stop face 32a in the transverse adjusting direction 12.

Figure 24:
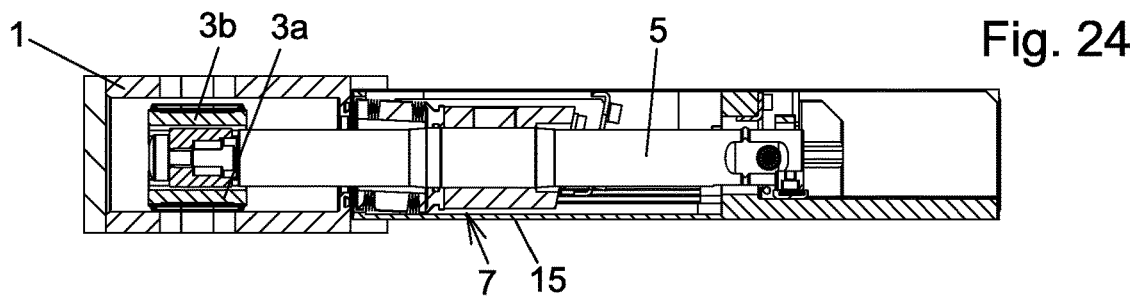
Figure 25:
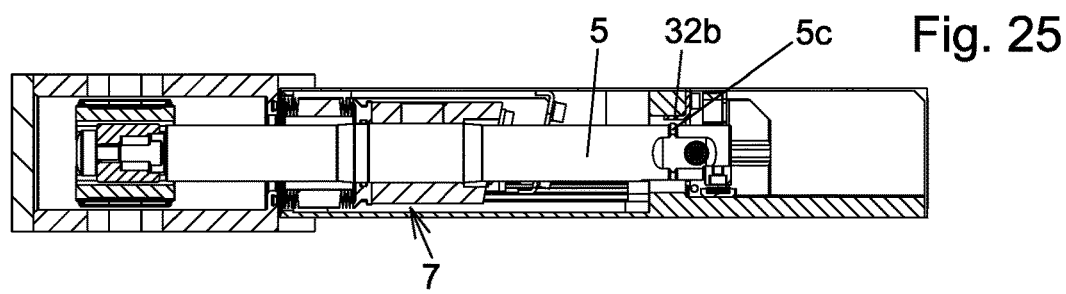

When the first valve plate 3a is pressed onto the first valve seat 9a, a supporting projection 5b of the valve rod 5, which supporting projection 5b is arranged in an end region of the valve rod 5 remote from the valve plates 3a, 3b, favorably bears against a supporting face which is stationary with respect to the base body 15 (cf. FIG. 24), as a result of which the transmission of the closing force from the transmission unit 16 to the closure unit 8 is improved.

The closure unit 8 has therefore reached the first closed position, the transmission unit 16 being situated in its first active position.

In order to open the vacuum valve, starting from this first closed state, in which the first valve opening 2a is sealed by the first valve plate 3a, the transmission unit 16 is adjusted by the at least one actuator 14 from the first active position via the intermediate position into the open position.

In order for it to be possible for the vacuum valve to be moved, starting from the first closed state of the vacuum valve, into the second closed state, in which the second valve plate 3b seals the second valve opening 2b, a blocking unit 33 is provided. In a locked state (FIG. 44), a displacement of the closure unit 8 in the direction which is opposed to the longitudinal adjusting direction 10 is blocked by said blocking unit 33 when the closure unit 8 is situated in the middle position. In a release state (FIG. 43) of the blocking unit 33, in contrast, a displacement of this type of the closure unit 8 is released.

Figure 43:
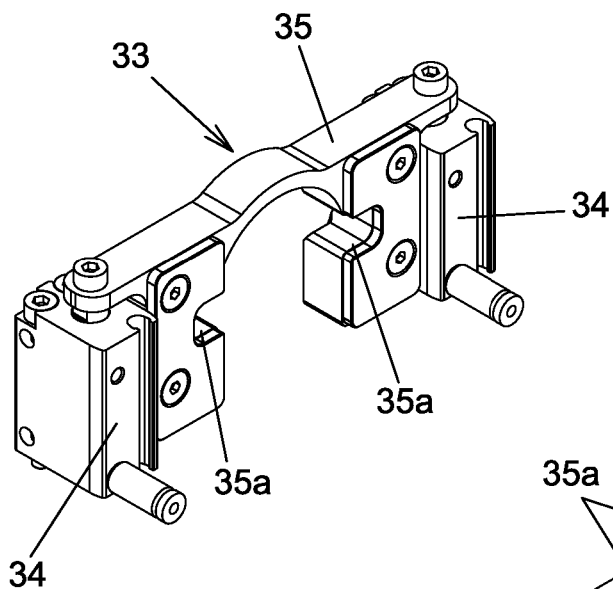
FIG. 43 shows a perspective view of the blocking unit in the release state.
Figure 44:
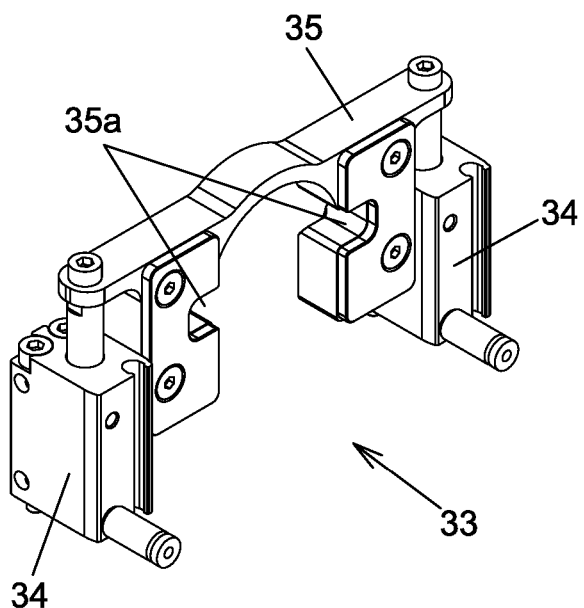
FIG. 44 shows a perspective view of the blocking unit in the locked state.
Figure 45:
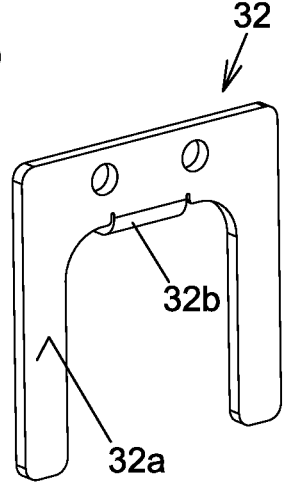
FIG. 45 shows a perspective view of the small stop plate which is attached to the base body of the drive unit.

The blocking unit 33 has a blocking part 35 which can be adjusted by at least one actuating part 34, see FIGS. 43 and 44, in particular. In the exemplary embodiment, there are two actuating parts 34 which are attached to the base body 15 of the drive unit 13 on both sides of the valve rod 5, between which actuating parts 34 the blocking part 35 extends. The blocking part 35 has an opening, through which the valve rod extends. Said opening has lateral widened portions 35a. In the release state of the blocking unit 33 and the open position of the closure unit 8, said lateral widened portions 35a are in the same alignment (in relation to the longitudinal adjusting direction 10), with the lateral projections 5a of the valve rod. When the closure unit 8 is adjusted from the open position into the middle position, the lateral projections 5a of the valve rod can therefore pass through the lateral widened portions 35a just before the middle position is reached. During the adjustment of the blocking unit 33 from the release state into the locked state, the blocking part 35 is adjusted by the actuating parts 34 parallel to the transverse adjusting direction 12. Therefore, the lateral widened portions 35a are offset with respect to the lateral projections 5a of the valve rod. In the middle position of the closure unit 8, in relation to the longitudinal adjusting direction 10, the blocking part 35 is situated directly behind the lateral projections 5a of the valve rod. In the locked state of the blocking unit 33, an adjustment of the closure unit 8 which is situated in the middle position is blocked counter to the longitudinal adjusting direction 10 as a result. A small amount of play of the closure unit 8 counter to the longitudinal adjusting direction 10 until said locking action occurs might be acceptable here.

The blocking part 35 is supported in the direction counter to the longitudinal adjusting direction 10 by supporting blocks 37 which are mounted in a stationary manner with respect to the base body 15.

In order to move the vacuum valve, starting from the first closed state, into the second closed state, in which the second valve opening 2b is sealed by the second valve plate 3b, the blocking unit 33 is therefore moved into the locked state, and the transmission unit 16 is displaced, starting from the first active position, in which the closure unit 8 is situated in the first closed position, by the at least one actuator 14 of the drive unit 13 in the opposite direction to the longitudinal adjusting direction 10. A displacement of the transmission unit 16 with respect to the carrier piece 7 along the oblique linear guides in the opposite direction to the oblique adjusting direction 19 occurs here. Therefore, the closure unit 8 is displaced from the first closed position in the opposite direction to the transverse adjusting direction 12. When the transmission unit 16 reaches the intermediate position, the closure unit 8 reaches the middle position.

During the further displacement of the transmission unit 16 counter to the longitudinal adjusting direction 10, a further displacement of the transmission unit 8 with respect to the carrier piece 7 along the oblique linear guides 18 counter to the oblique adjusting direction 19 occurs as a result of the blocking of the displacement of the closure unit 8 counter to the longitudinal adjusting direction 10 with compression of the springs 21, and the closure unit 8 is therefore displaced further counter to the transverse adjusting direction 12 until the second valve plate 3b is pressed onto the second valve seat 9b. During this displacement of the closure unit 8 counter to the transverse adjusting direction, the projections 5a are displaced along the face of the blocking part 35, against which they bear, counter to the transverse adjusting direction.

Figure 26:
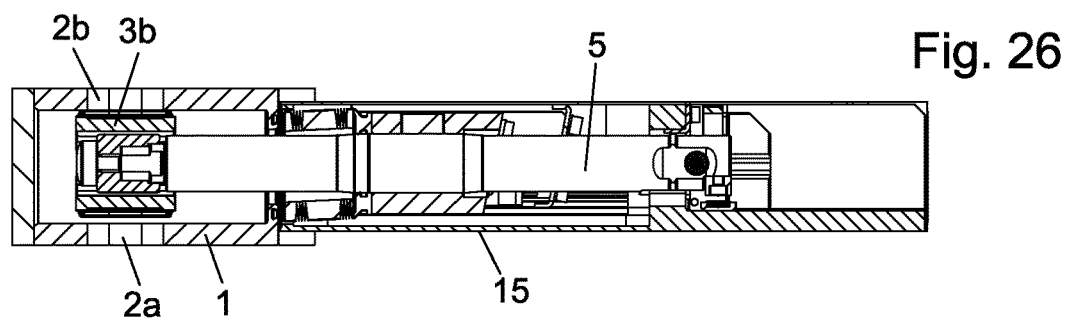
Figure 27:
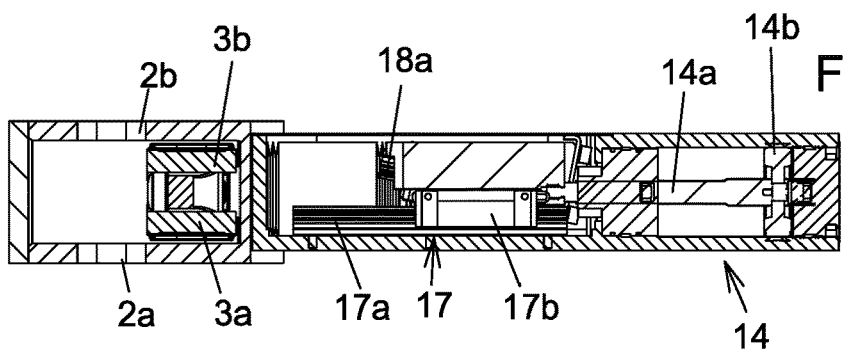
Figure 28:
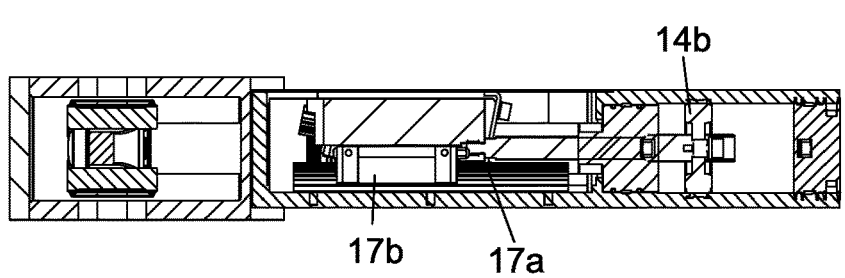
Figure 29:
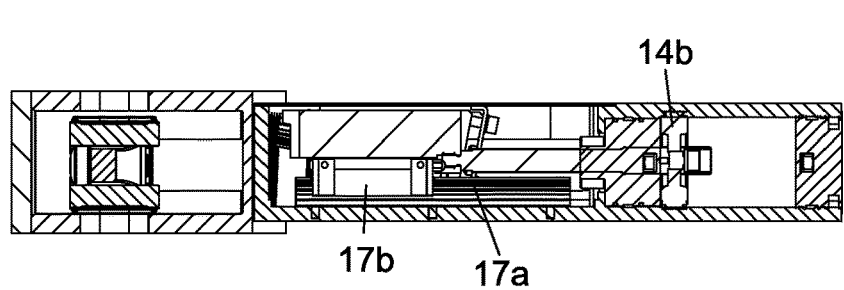
Figure 30:
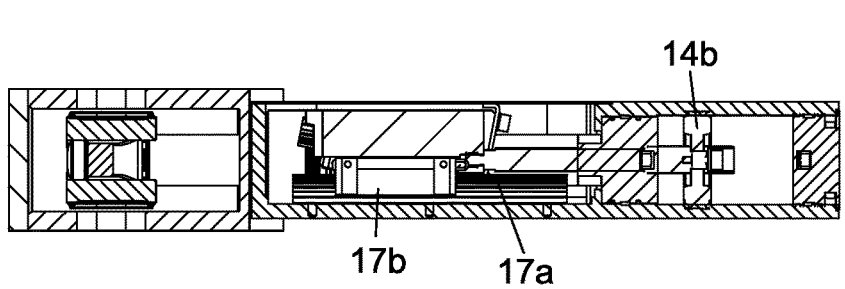
Figure 31:
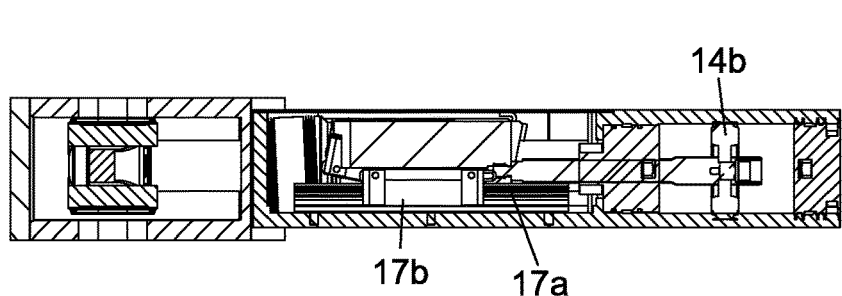
Figure 32:
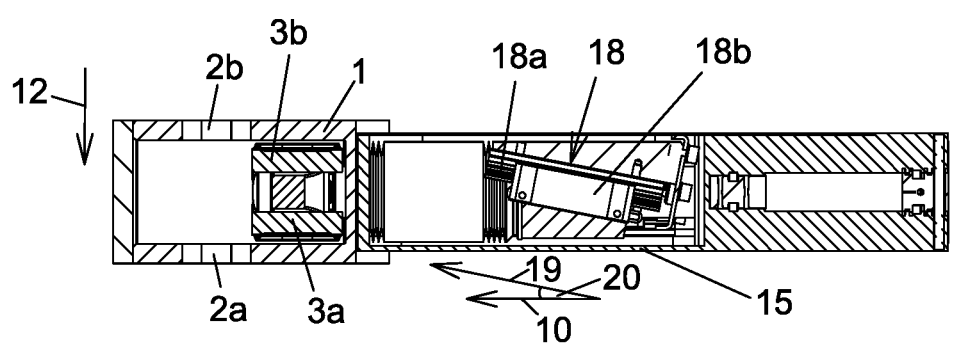
FIG. 32 shows a section along the line C-C from FIG. 21, FIGS. 33 to 36 show sections in accordance with FIG. 23 in the positions in accordance with FIGS. 23 to 26.
Figure 33:
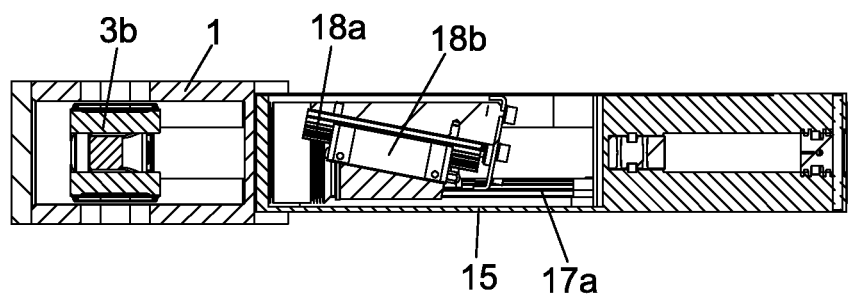
Figure 34:
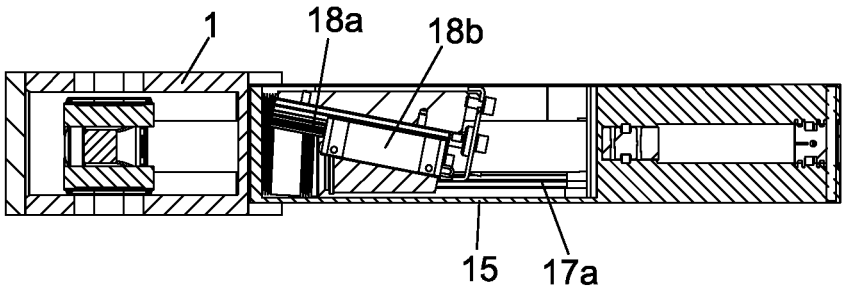
Figure 35:
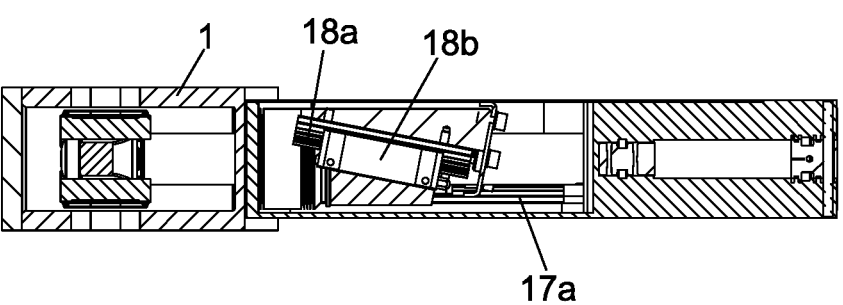
Figure 36:
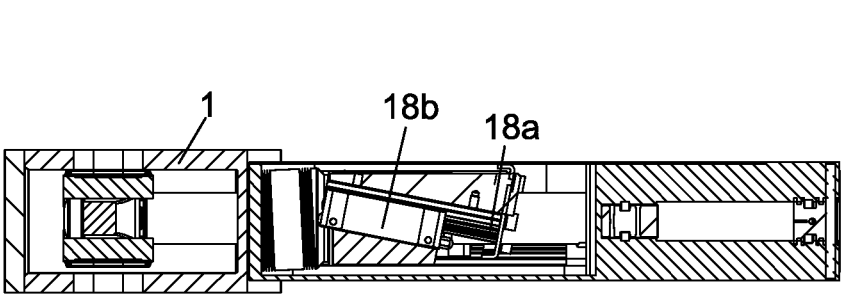
Figure 37:
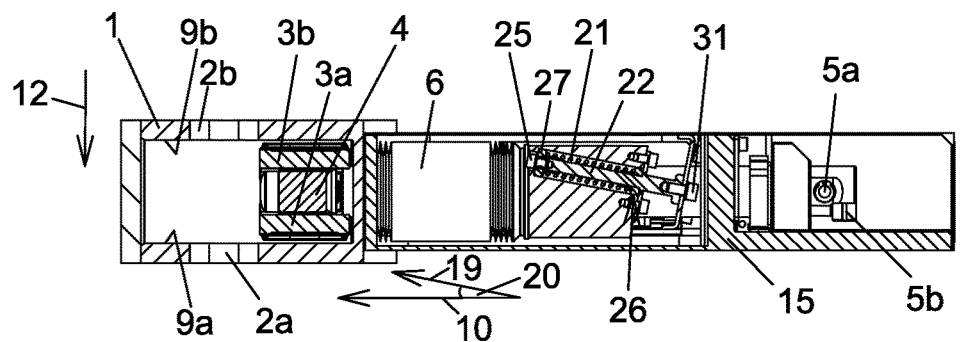
FIG. 37 shows a section along the line D-D from FIG. 21, FIGS. 38 to 41 show sections in accordance with FIG. 37 in the positions in accordance with FIGS. 23 to 26.
Figure 38:
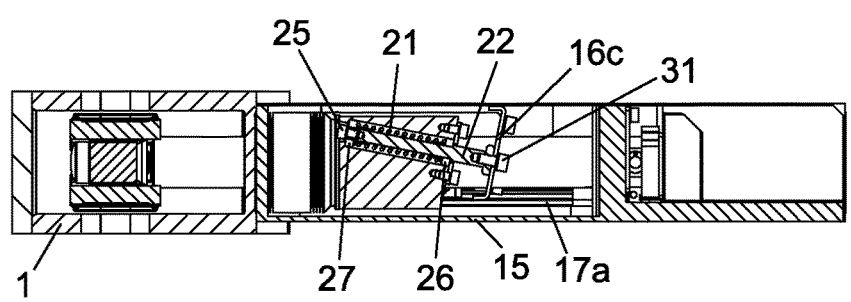
Figure 39:
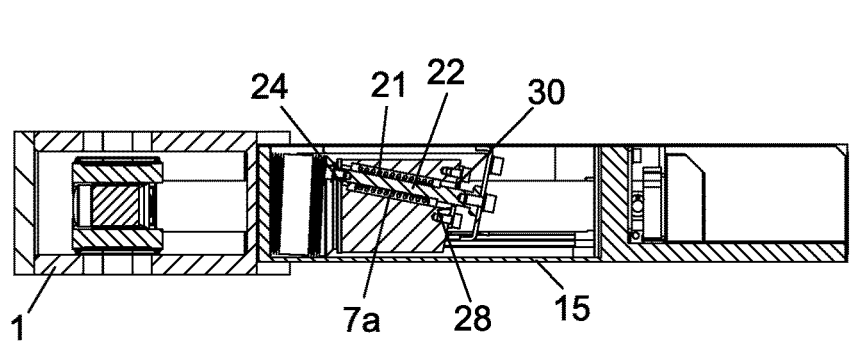
Figure 40:
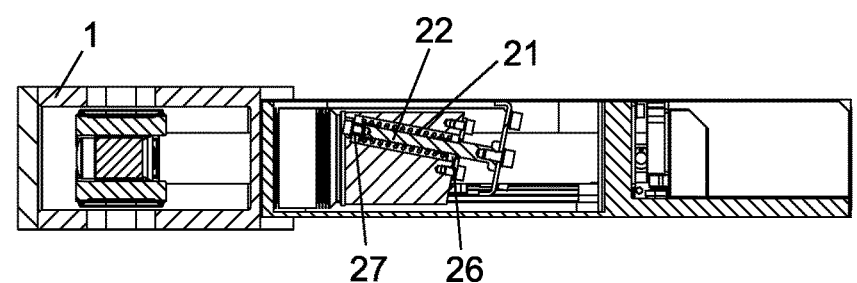
Figure 41:
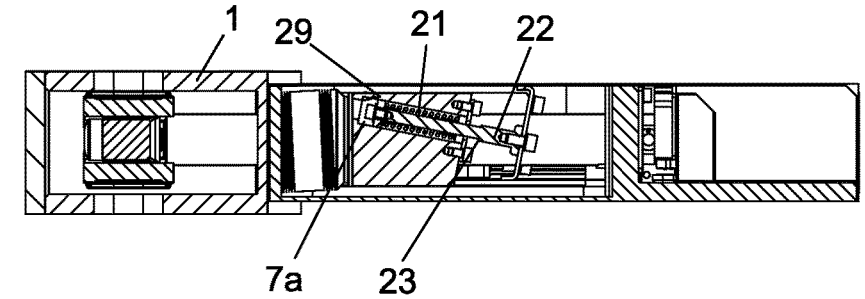
Figure 42:
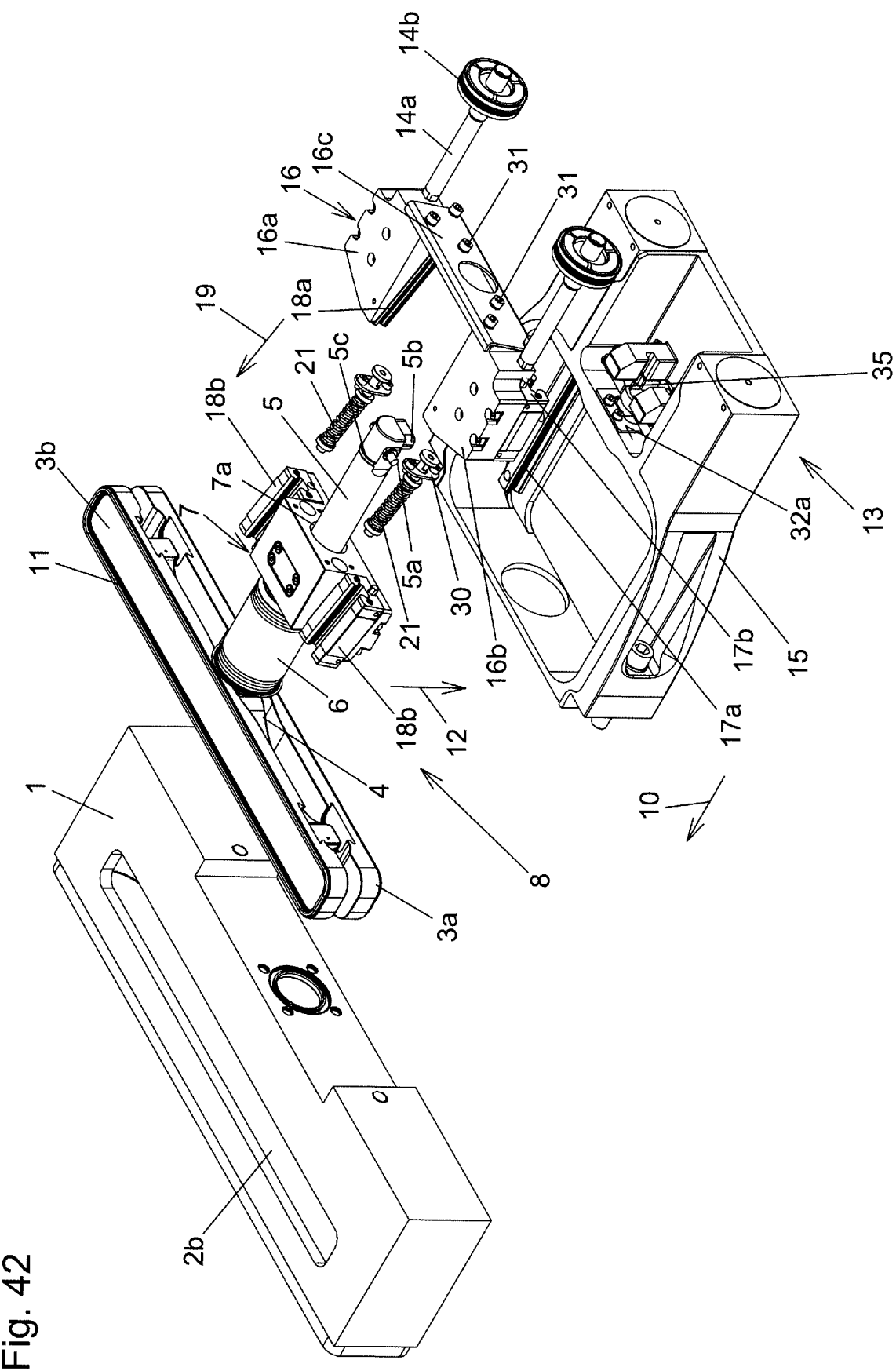
FIG. 42 shows a perspective view in the partially exploded state of the vacuum valve.

When the second valve plate 3b is pressed onto the second valve seat 9b, a supporting projection 5c of the valve rod 5, which supporting projection 5c is arranged in an end region of the valve rod remote from the valve plates 3a, 3b and is formed (for example, as shown) by a projecting bead which is configured on the valve rod, favorably bears against the supporting face which is stationary with respect to the base body (cf. FIG. 26), as a result of which the transmission of the closing force from the transmission unit to the closure unit is improved. In the exemplary embodiment, the supporting faces formed by a bent-over tab 32b of the small stop plate 32.

Therefore, the closure unit 8 has reached the second closed position. Here, the transmission unit 16 is situated in the second active position. This second active position is displaced to a corresponding extent in the direction of the starting position with respect to the intermediate position.

In order to open the vacuum valve, starting from the second closed state, the transmission unit 16 is first of all displaced by the at least one actuator 14 in the longitudinal adjusting direction 10 as far as into the first active position, the closure unit 8 being displaced into the first closed position. The blocking unit 33 is adjusted into the release state, and the transmission unit 16 is adjusted by the at least one actuator 14 counter to the longitudinal adjusting direction 10 into the starting position.

In order to open the vacuum valve, starting from the second closed state, it would in principle be sufficient for the transmission unit 16 to be adjusted from the second active position as far as the intermediate position in the longitudinal adjusting direction 10, for the blocking unit 33 to be moved into the open state, and for the transmission unit 16 to be displaced from the intermediate position into the starting position. To this end, correspondingly actuable actuators 14 would have to be provided.

It might also be made possible by way of correspondingly actuable actuators for the transmission unit to be adjusted from the starting position into the intermediate position and then, after adjusting of the blocking unit into the locked state, from the intermediate position directly into the second active position. Therefore, the closure unit might be moved from the open position via the middle position directly into the second closed position.

Different further modifications of the exemplary embodiment which is shown are conceivable and possible, without departing from the scope of the invention, as defined in the claims. Thus, for example, the stop device might be configured in some other way; other parts of the closure unit than the valve rod might also have stop parts which interact with a stop face which is stationary with respect to the base body of the drive unit. Said stop face might also be arranged on the valve housing or on a part which is connected to it.

The at least one stop part of the stop device and the stop face, with which it interacts, are preferably arranged outside the vacuum region of the vacuum valve.

In the exemplary embodiment, the closure unit is pushed via the at least one spring 21 by the transmission unit during the adjustment of the transmission unit from the starting position into the intermediate position. Instead, the closure unit might also be pulled by the transmission unit via the at least one spring.

In the exemplary embodiment which is shown, the at least one spring is shortened during the adjustment of the transmission unit from the intermediate position into the first active position and from the intermediate position into the second active position. Instead, an embodiment would also be conceivable and possible, in the case of which the spring is lengthened during the adjustment of the transmission unit from the intermediate position into the first active position and/or from the intermediate position into the second active position. For example, an extension of this type might also take place from a more compressed state into a less compressed state, for example during the adjustment of the transmission unit from the intermediate position into the second active position.

The at least one spring 21 might fundamentally also be arranged in a manner which deviates from an orientation parallel to the oblique adjusting direction; it would then have to be capable of being displaced in relation to the transverse adjusting direction with respect to the transmission unit and/or the carrier piece.

LIST OF REFERENCE NUMERALS

1 Valve housing
2a First valve opening
2b Second valve opening
3a First valve plate
3b Second valve plate
4 Carrier
5 Valve rod
5a Projection
5b Supporting projection
5c Supporting projection
6 Diaphragm bellows
7 Carrier piece
7a Through bore
8 Closure unit
9a Valve seat
9b Valve seat
10 Longitudinal adjusting direction
11 Sealing ring
12 Transverse adjusting direction
13 Drive unit
14 Actuator
14a Piston rod
14b Piston
15 Base body
16 Transmission unit
16a Part piece
16b Part piece
16c Connecting part
17 Longitudinal linear guide
17a Guide rail
17b Carriage
18 Oblique linear guide
18a Guide rail
18b Carriage
19 Oblique adjusting direction
20 Angle
21 Spring
22 Bolt
23 Stop
24 Stop
25 Screw
26 Stop part
27 Stop part
28 Stop face
29 Stop face
30 Small plate
31 Screw
32 Small stop plate
32a Stop face
33 Blocking unit
34 Actuating part
35 Blocking part
35a Widened portion
36 Shim
37 Supporting block

The invention claimed is:

1. A vacuum valve comprising:
a valve housing with a first valve opening having an axis and is surrounded by a first valve seat;
a closure unit having a valve rod which protrudes out of the valve housing, a carrier piece connected rigidly to the valve rod outside the valve housing, and a first valve plate supported by the valve rod and arranged within the valve housing, wherein the closure unit is adjustable, starting from an open position, in which the first valve plate releases the first valve opening, in a longitudinal adjusting direction into a middle position, in which the first valve plate covers the first valve opening but is lifted up from the first valve seat, and, starting from the middle position, in a transverse adjusting direction, which lies at a right angle with respect to the longitudinal adjusting direction, into a first closing position, in which the first valve plate bears against the first valve seat;
a transmission unit;
a drive unit with a base body, connected rigidly to the valve housing, and at least one actuator;
at least one longitudinal linear guide, by which the transmission unit is guided displaceably parallel to the longitudinal adjusting direction with respect to the base body of the valve drive, the transmission unit being adjustable by the at least one actuator with respect to the base body in the longitudinal adjusting direction from a starting position via an intermediate position into a first active position;
at least one oblique linear guide, by which the carrier piece is guided displaceably with respect to the transmission unit parallel to an oblique adjusting direction which lies in a plane, defined by the longitudinal adjusting direction and transverse adjusting direction, at an angle with respect to the longitudinal adjusting direction and at an angle with respect to the transverse adjusting direction;
at least one spring which acts between the transmission unit and the carrier piece drives the carrier piece during the adjustment of the transmission unit with respect to the base body from the starting position as far as the intermediate position, an adjustment of the closure unit taking place in the longitudinal adjusting direction from the open position into the middle position;
a stop device which blocks an adjustment of the closure unit in the longitudinal adjusting direction in the middle position of the closure unit, further driving of the carrier piece in the longitudinal adjusting direction being blocked during the further adjustment of the transmission unit with respect to the base body from the intermediate position into the first active position, and an adjustment of the transmission unit with respect to the carrier piece taking place in the oblique adjusting direction with deformation of the spring and therefore an adjustment of the closure unit taking place in the transverse adjusting direction from the middle position into the first closed position;

the valve housing including a second valve opening which is surrounded by a second valve seat and lies opposite the first valve opening;

the closure unit has a second valve plate which is supported by the valve rod and is arranged within the valve housing, the second valve plate releasing the second valve opening in the open position of the closure unit, and the closure unit covering the second valve opening but being lifted up from the second valve seat in the middle position of the closure unit, and the closure unit being adjustable, starting from the middle position, counter to the transverse adjusting direction into a second closed position, in which the second valve plate bears against that the second valve seat, and a blocking unit configured to be switched over between a blocked state and a release state, wherein in the blocked state, an adjustment of the closure unit which is situated in the middle position is blocked counter to the longitudinal adjusting direction in the direction of the open position, and in the release state, such an adjustment of the closure unit is released, and wherein in the blocked state of the blocking unit in the case of an adjustment of the transmission unit with respect to the base body by way of the at least one actuator counter to the longitudinal adjusting direction from the intermediate position as far as the second active position, an adjustment of the transmission unit with respect to the carrier piece taking place counter to the oblique adjusting direction with deformation of the spring, and therefore an adjustment of the closure unit taking place counter to the transverse adjusting direction from the middle position into the second closed position.

2. The vacuum valve according to claim 1, wherein the longitudinal linear guide and the oblique linear guide each include a guide rail and a carriage which is mounted displaceably along the guide rail.

3. The vacuum valve according to claim 1, wherein the at least one actuator is a pneumatic piston/cylinder unit.

4. The vacuum valve according to claim 1, wherein the blocking unit has a blocking part which is adjustable by at least one actuating part.

5. The vacuum valve according to claim 4, wherein the blocking part is adjustable between the release state and the blocked state of the blocking unit at a right angle with respect to the longitudinal adjusting direction.

6. The vacuum valve according to claim 5, wherein the blocking part interacts with at least one projection which projects from the valve rod and is arranged in a region of an end of the valve rod which is remote from the valve plate.

7. The vacuum valve according to claim 6, wherein the at least one projection which projects from the valve rod forms a stop part of the stop device, the stop device further comprises a stop face which is stationary with respect to the base body and with which the projection comes into contact during the adjustment of the transmission unit from the starting position into the first active position when the middle position of the closure unit is reached.

8. The vacuum valve according to claim 1, wherein the carrier piece is fastened to the valve rod in a middle region of the longitudinal extent of the valve rod.

9. The vacuum valve according to claim 1, wherein the spring is arranged on a bolt, supported at the two ends on stop parts which are displaceable with respect to the bolt and are pressed by the spring onto stops of the bolt or of a part connected to the bolt.

10. The vacuum valve according to claim 9, wherein a rear end of the bolt in relation to the oblique adjusting direction, is connected to the transmission unit, and a rear one of the stop parts in relation to the oblique adjusting direction bears against a rear stop face, and a front one of the stop parts in relation to the obliquely adjusting direction, bears against a front stop face, the rear and front stop faces being arranged on the carrier piece or a part which is connected to the carrier piece.

* * * * *